US008838935B2

(12) United States Patent
Hinton et al.

(10) Patent No.: US 8,838,935 B2
(45) Date of Patent: Sep. 16, 2014

(54) APPARATUS, METHOD, AND SYSTEM FOR IMPLEMENTING MICRO PAGE TABLES

(75) Inventors: Glenn Hinton, Portland, OR (US); Madhavan Parthasarathy, Portland, OR (US); Rajesh Parthasarathy, Hillsboro, OR (US); Muthukumar Swaminathan, Folsom, CA (US); Raj Ramanujan, Federal Way, WA (US); David Zimmerman, El Dorado Hills, CA (US); Larry O. Smith, Beaverton, OR (US); Adrian C. Moga, Portland, OR (US); Scott J. Cape, Portland, OR (US); Wayne A. Downer, Portland, OR (US); Robert S. Chappell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 12/890,585

(22) Filed: Sep. 24, 2010

(65) Prior Publication Data
US 2012/0079232 A1    Mar. 29, 2012

(51) Int. Cl.
*G06F 12/00* (2006.01)
*G06F 12/10* (2006.01)
*G06F 12/02* (2006.01)

(52) U.S. Cl.
CPC ...... *G06F 12/1027* (2013.01); *G06F 2212/651* (2013.01); *G06F 2212/205* (2013.01); *G06F 12/0292* (2013.01); *G06F 12/1009* (2013.01)
USPC .......................... 711/207; 711/203; 711/206

(58) Field of Classification Search
None
See application file for complete search history.

(56) References Cited

U.S. PATENT DOCUMENTS

| 6,360,303 | B1* | 3/2002 | Wisler et al. ................. 711/152 |
| 7,428,626 | B2* | 9/2008 | Vega .............................. 711/203 |
| 2003/0005249 | A1* | 1/2003 | Wilson et al. ................. 711/165 |

(Continued)

FOREIGN PATENT DOCUMENTS

| TW | 200708952 | 3/2007 |
| TW | 200842579 | 10/2008 |
| WO | 2009120937 | 10/2009 |

OTHER PUBLICATIONS

International Search Report & Written Opinion mailed May 1, 2012 for PCT Application No. PCT/US2011/053306, 8 pages.

(Continued)

*Primary Examiner* — Matthew Bradley
*Assistant Examiner* — Daniel Tsui
(74) *Attorney, Agent, or Firm* — Schwabe, Williamson & Wyatt, P.C.

(57) ABSTRACT

In one embodiment the apparatus is a micro-page table engine that includes logic that is capable of receiving a memory page request for a page in global memory address space. The apparatus also includes a translation lookaside buffer (TLB) that is capable of storing one or more memory page address translations. Additionally, the apparatus also has a page miss handler capable of performing a micro physical address lookup in a page miss handler tag table in response to the TLB not storing the memory page address translation for the page of memory referenced by the memory page request. The apparatus also includes memory management logic that is capable of managing the page miss handler tag table entries.

25 Claims, 12 Drawing Sheets

(56) References Cited

U.S. PATENT DOCUMENTS

| | | |
|---|---|---|
| 2005/0108496 A1 | 5/2005 | Elnozahy et al. |
| 2006/0184713 A1 | 8/2006 | Hildner |
| 2006/0206687 A1 | 9/2006 | Vega |
| 2007/0011421 A1 | 1/2007 | Keller, Jr. et al. |
| 2007/0061549 A1 | 3/2007 | Kaniyur et al. |
| 2008/0082779 A1 | 4/2008 | Ogasawara et al. |
| 2010/0082883 A1* | 4/2010 | Chen et al. .................... 711/103 |
| 2010/0281230 A1* | 11/2010 | Rabii et al. .................... 711/165 |

OTHER PUBLICATIONS

European Search Report, issued in European Patent Application No. 11827736.7, mailed May 27 2014, 7 pages.

Office Action, issued in Tawain Patent Application No. 100134352, mailed May 30, 2014, 7 pages.

* cited by examiner

APPARATUS, METHOD, AND SYSTEM FOR IMPLEMENTING MICRO PAGE TABLES

FIELD OF THE INVENTION

The invention relates to memory page tables implemented in a computer system.

BACKGROUND OF THE INVENTION

A modern computer system incorporates complex memory management schemes to handle the sharing of system memory among components in the system. The computer system may include several multi-core processors, where each core (i.e., each hardware thread) requires access to memory. For example, the operating system running on the system as well as potentially a virtual machine monitor may both include logic to help manage the sharing of system memory among all the hardware threads. This memory management many times does not take into account the physical constraints of how the memory is actually laid out in the system. For example, there may be a memory power savings ability which allows ranks of memory to be powered down into low power states to save platform power. In another example, there may be multiple physical types of memory in the system (i.e., a heterogeneous memory system rather than a homogenous one). These varied physical implementations of the memory subsystem of a computer system may not benefit as much from standard memory management currently available through the means discussed.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of an apparatus, method, system, and machine readable medium to implement micro page tables are described.

A computer system may implement additional hardware and firmware logic to manage memory in an efficient manner through the use of micro page tables that map software view of memory to the physical implementation of memory. A micro page table-implemented architecture may comprise certain logic in a processor core and uncore to manage an additional set of hidden data structures. These hidden data structures are transparent to the overlying operating system and applications running on the computer.

Historically when an operational CPU receives a memory request from the operating system it comprises a linear memory address. This linear memory address is not the actual physical address of the requested memory location, but rather an address utilized by an operating system in the computer system. To get to the actual physical address, logic within the CPU takes the linear address and performs a walk through the standard memory page tables to find the physical page. In many embodiments, a processor implementing micro page tables requires an extra step in the walk. What would normally be the physical address at the end of a page walk lookup process (a Platform Physical Address—PPA) is actually is one level removed from the true physical address, which may now be referred to as a micro physical address (MPA).

Micro page table engine logic implemented in the CPU utilizes a page miss handler tag table, which has the PPA as an index, to find the MPA address. By increasing the level of indirection by one additional level, logic within the micro page table engine can perform a great deal of memory management of physical memory completely unbeknownst to any other hardware or software in the system. What follows is an in-depth description of the conceptual layout of micro page tables in several different general purpose computer systems as well as several different implementations of micro page tables and how they may be utilized to provide additional benefits to computer memory management.

Creating micro page tables may allow for a potentially transparent way of splitting memory between near (e.g., high performance/high power consumption memory) and far (e.g., low performance/low power consumption memory) portions of memory. This extra layer of memory management may allow an optimization of memory subsystem cost, memory power consumption, and memory performance.

Micro Page Table General Implementation

Figure 1:
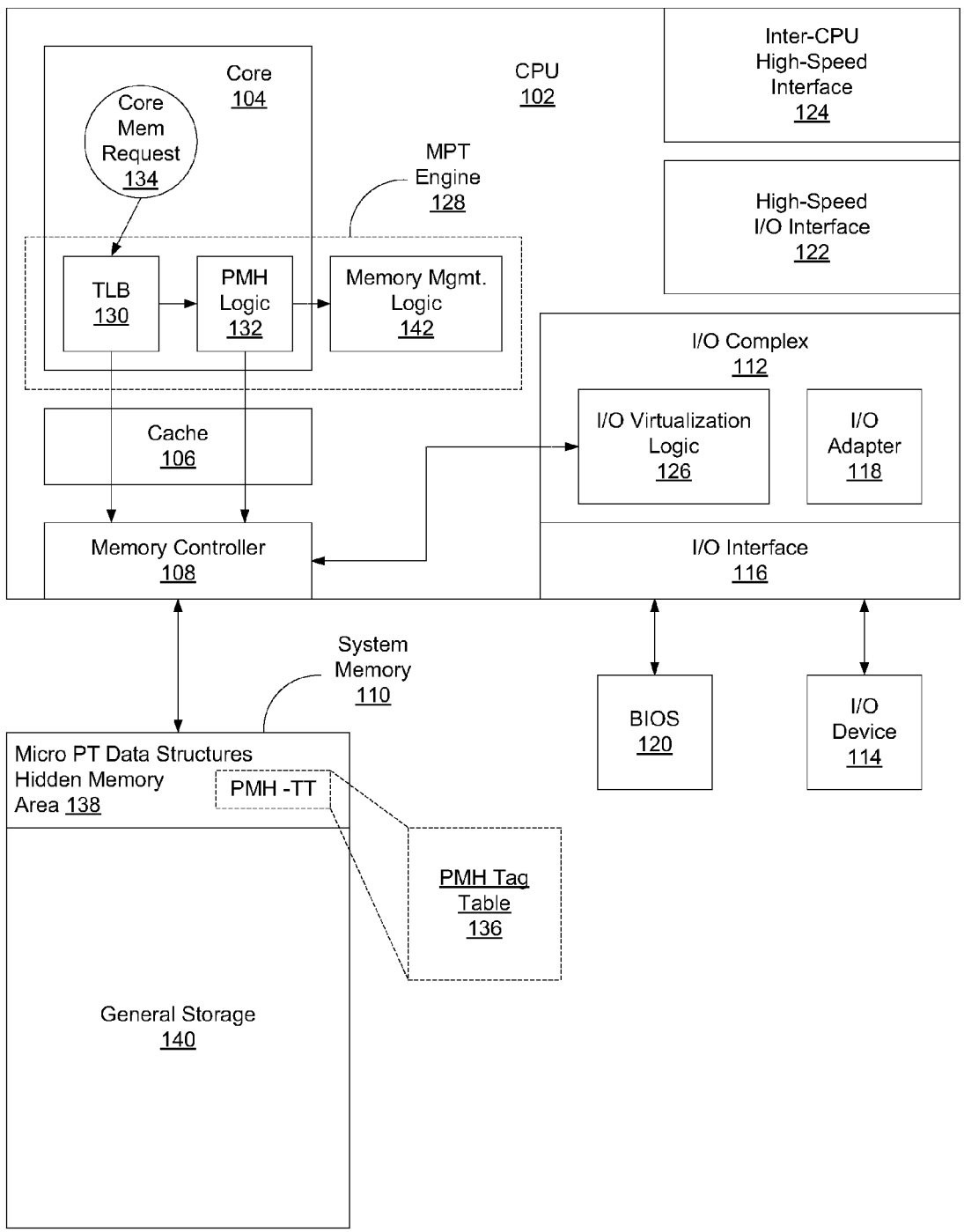
FIG. 1 describes one embodiment of a computer system implementing micro-page tables.

FIG. 1 describes one embodiment of a computer system implementing micro-page tables.

Computer system 100 is shown. The computer system may be a desktop, server, workstation, laptop, handheld, television set-top, media center, game console, integrated system (such as in a car), or other type of computer system. In several embodiments the computer system 100 includes one or more central processing units (CPUs). Although in many embodiments there are potentially many CPUs, in the embodiment shown in FIG. 1 only CPU 102 is shown for clarity. CPU 102 may be an Intel® Corporation CPUs or CPUs of another brand. CPU 102 includes one or more cores in different embodiments. CPU 102 is shown including a single core (Core 104), again, for sake of clarity.

In many embodiments, core 104 includes internal functional blocks such as one or more execution units, retirement units, a set of general purpose and specific registers, etc. If core 104 is multi-threaded or hyper-threaded, then each hardware thread may be considered as a "logical" core as well.

CPU 102 may also include one or more caches, such as cache 106. In many embodiments that are not shown, additional caches other than cache 106 are implemented so that multiple levels of cache exist between the execution units in the core and memory. In different embodiments cache 106 may be apportioned in different ways. Additionally, cache 106 may be one of many different sizes in different embodiments. For example, cache 106 may be an 8 megabyte (MB) cache, a 16 MB cache, etc. Additionally, in different embodiments the cache may be a direct mapped cache, a fully associative cache, a multi-way set-associative cache, or a cache with another type of mapping. In other embodiments that include multiple cores, cache 106 may include one large portion shared among all cores or may be divided into several separately functional slices (e.g., one slice for each core). Cache 106 may also include one portion shared among all cores and several other portions that are separate functional slices per core.

In many embodiments, CPU 102 includes an integrated system memory controller 108 to provide an interface to communicate with system memory 110. In other embodiments that are not shown, memory controller 108 may be located in a discrete chip elsewhere in computer system 100.

System memory 110 may comprise dynamic random access memory (DRAM), such as a type of double data rate (DDR) DRAM, non-volatile memory such as flash memory, phase change memory (PCM), or another type of memory technology. System memory 110 may be a general purpose memory to store data and instructions to be operated upon by CPU 102. Additionally, there may be other potential devices within computer system 100 that have the capability to read and write to the system memories, such as a direct memory access (DMA)-capable I/O (input/output) device.

The link (i.e., bus, interconnect, etc.) that couples CPU 102 with system memory 110 may include one or more optical, metal, or other wires (i.e. lines) that are capable of transporting data, address, control, and clock information.

I/O complex 112 enables communication between the CPU 102 and one or more I/O devices, such as I/O device 114. In the embodiment shown in FIG. 1, I/O device 114 is communicatively coupled to the I/O complex 112 and the rest of CPU 102 through I/O interface 116. I/O complex 112 may be an I/O hub interface that comprises several I/O host adapters and other I/O circuitry to provide access between CPU 102 and much of the I/O subsystem. For example, I/O Complex 112 may comprise a platform controller hub (PCH). Specifically, the I/O complex 112 can provide a general communication interface between a number of I/O devices coupled to one or more I/O interconnects (i.e. I/O busses) and the CPU 102. To accomplish this, I/O hub complex may have at least one integrated I/O adapter for each I/O protocol utilized. There may be many I/O devices communicatively coupled to I/O interface 116, though only I/O device 114 is shown for clarity.

I/O adapter 118, shown in FIG. 1 as an integrated I/O adapter within I/O complex 112, translates a host communication protocol utilized within the CPU 102 to a protocol compatible with a particular I/O device, such as I/O device 118. Some of the protocols that a given I/O adapter may translate include a Peripheral Component Interconnect (PCI)-Express, Universal Serial Bus (USB), Serial Advanced Technology Attachment (SATA), Small Computer System Interface (SCSI), Redundant Array of Inexpensive Disks (RAID), and 1394 "Firewire," among others. Additionally, there may be one or more wireless protocol I/O adapters. Examples of wireless protocols are Bluetooth, IEEE 802.11-based wireless protocols, and cellular protocols, among others In many embodiments, the BIOS 120 (basic input/output system) is coupled to the I/O complex 112. The BIOS is firmware stored in the computer system that contains instructions to initialize key computer system components during a boot process. The BIOS 120 generally is stored within a flash memory device, though other such storage devices designed to store information in a non-volatile manner may also be utilized to store the BIOS. Additionally, although not shown in FIG. 1, other firmware beyond simply the BIOS may also be stored in flash devices coupled to the CPU 102 such as extendible firmware.

Apart from I/O interface 116, there may be other interfaces integrated into CPU 102 to provide a communicative interface with one or more links external to the CPU 102. High-speed I/O interface 122 may communicatively couple CPU 102 to one or more links to high speed I/O subsystems such as a graphics subsystem and/or a network subsystem. For example, high-speed I/O interface may be a single or multi-lane high-speed, bidirectional, serial interface such as PCI-Express. Inter-CPU high-speed interface 124 may provide an interface to a link coupled to one or more additional CPUs and allow inter-CPU communications to take place. E.g., Inter-CPU high-speed interface may be a quick path interconnect (QPI) or other similar interface.

In many embodiments, computer system 100 includes hardware and software logic capable of providing a virtualized environment with one or more guest operating systems (OSes) running in virtual machine (VM) environments. A virtual machine monitor (VMM) or hypervisor may be implemented in logic within the system to isolate each VM's operating environment (i.e. so each VM and the OS and applications running within it is isolated from and unaware of other VMs present in the system.

One of the areas required to create a seamless virtualized environment is virtualized I/O. I/O virtualization logic 126 provides the ability to virtualize and isolate I/O devices in the I/O subsystem, such as I/O device 114. In some embodiments, I/O virtualization logic includes Intel® VT-d architecture.

Device transfers (Direct Memory Accesses—DMAs) and interrupts that are initiated by an I/O device are the key processes that require device isolation to a given VM. In many embodiments, I/O virtualization logic 126 may enable system software to create multiple DMA protection domains. A protection domain is an isolated environment to which a subset of the system memory is allocated. Depending on the software usage model, a DMA protection domain may represent memory allocated to a VM, or the DMA memory allocated by a guest-OS driver running in a VM or as part of the VMM or hypervisor itself. The I/O virtualization logic 126 may enable system software to assign one or more I/O devices to a protection domain. DMA isolation is achieved by restricting access to a protection domain's physical memory from I/O devices not assigned to it.

For interrupt handling, I/O virtualization logic 126 may modify the interrupt-message format to be a DMA write request that includes a "message identifier" and not the actual interrupt attributes. The write request, like any DMA request, may specify the requester-id of the I/O device function generating the interrupt. Then, when the interrupt request is received by the I/O virtualization logic 126, the interrupt is remapped through a table structure of interrupts. Each entry in the interrupt-remapping table corresponds to a unique interrupt message identifier from a device, including any necessary interrupt attributes (e.g., destination CPU, vector, etc.).

In the embodiment shown in FIG. 1, I/O virtualization logic 126 receives requests from one or more I/O devices through the I/O interface 116. The I/O virtualization logic 126 handles these requests, as described above, prior to allowing them to pass through to the memory controller 108.

In many embodiments, micro page table (MPT) engine 128 logic is implemented in core 104 to provide a hardware managed memory address space using possibly hidden (from the OS and applications) page table structures. The MPT engine 128 virtualizes the memory address space as seen by OS and application software running on the computer system 100. Specifically, software, which may include an operating system running one or more applications/processes, assumes that it can ask directly for access to a physical address in system memory 110, but the MPT engine 128 provides a hidden level of indirection so physical memory may be managed separately from the layout of physical memory that the kernel in the operating system is aware of. This hardware-implemented possibly hidden level of indirection for memory manages all memory coherency and data movement between regions of system memory 110.

The MPT engine 128 includes a modified translation lookaside buffer (TLB) 130 and page miss handler (PMH) logic 132 within each core, such as core 104.

In many embodiments, the TLB 130 is generally considered a CPU cache that memory management hardware uses to improve linear address translation speed. The TLB 130 includes a fixed number of slots that contain page table entries, which generally map a linear address to a platform physical address (PPA). Furthermore, the TLB 130 is a content-addressable memory (CAM), in which the search key is the linear address and the search result is the platform physical address. If the requested linear address, from a core memory request 134, is present in the TLB, the CAM search yields a match, which is a TLB hit. Otherwise, if the requested address is not in the TLB the CAM search results in a TLB miss.

If there is a TLB hit, the linear address→platform physical address translation has already taken place and the translation is stored in the TLB 130. If there is a TLB miss, the translation is accordingly not stored and MPT engine 128 logic is then required to perform a page walk using OS-established page tables to retrieve the platform physical address. Once the page walk has been completed, the correct platform physical address is found and the translation can then be stored into the TLB.

Although, in computer system 100, the platform physical address is not the actual physical memory address used for accessing the memory devices that comprise system memory 110. Rather, once the MPT engine 128 has received the platform physical address of the translation, the platform physical address is then used as an index (i.e., a search key) into a PMH tag table (TT) 136 stored in a hidden area of memory 138 to retrieve the true address into physical memory. In other embodiments that may be utilized throughout this document, the memory area 138, and potentially some or all of the structures that it stores, is not hidden but rather visible to an OS and software applications.

Specifically, the PMH TT 136 has a number of entries. Each entry stores a micro physical address (MPA), which directly maps into final physical memory space. Thus, it takes at least two address translations to get the MPA from the linear address. The additional table lookup when using the MPT engine 128 is the table lookup utilized to translate the platform physical address into the MPA. In other words, a basic address translation in computer system 100 would be processed in the following order: linear address→platform physical address MPA. The platform physical address to micro physical address→translation (using the PMH TT 136) is a fully associative mapping. Thus, any entry in the PMH TT 136 is capable of storing any MPA. Once the MPT Engine has retrieved the MPA from the PMH-TT it stores this in the TLB for subsequent accesses where a translation from linear address to MPA can be done directly. In other embodiments, the PMH TT 136 may be implemented with more restricted set associativity.

In many embodiments, the hidden area of memory 138 that stores all necessary MPT data structures, such as the PMH TT 136, is not visible to software (e.g., the OS) and is specifically utilized by the MPT engine 128 to manage physical memory through an extra layer of address indirection (i.e., an extra translation using a table in the hidden area 138).

In embodiments where the platform is running in a virtualized environment and the memory address request is received from a guest OS (or more generally, a guest VM), there is a second additional address translation using another address translation table referred to as an extended page table (EPT). Specifically, the linear address received from the guest OS is first translated into a guest physical address (GPA) through a standard page walk using the OS page tables, the guest physical address is then translated into the platform physical address (PPA) by using the EPT, and finally the platform physical address is translated to the corresponding MPA by using the PMH TT 136.

Memory management logic (MML) 142 resides in the CPU 102. In some embodiments, MML 142 is implemented in the core 104, outside of the core 104 (e.g., the uncore), or possibly even implemented across both the core and uncore. The uncore generally refers to logic/circuitry within a CPU that is not actually in the core. For example, certain I/O circuitry which allows communication between the cores of a given CPU and other CPUs may be located in the uncore of the CPU. MML 142 is a portion of the MPT engine 128 that assists in managing the MPT data structures, such as the PMH-TT 136. In many embodiments, which will be discussed in detail below, memory pages will be designated in certain ways and the data stored on those pages may need to be swapped out to other pages. The management of these memory page swap transfers may be handled in large part by the MML 142. In the embodiment shown in FIG. 1, MML 142 comprises hardware circuitry in the uncore, microcode stored in the uncore, or a combination of both. In other embodiments that are not shown, the circuitry and/or microcode comprising the MML 142 resides in the core. Yet other embodiments, the MML 142 may span the core and uncore.

Furthermore, there are the PMH-TT 136 as well as the additional data structures stored in the hidden memory area 138 may be referred to in general as the "micro page tables" that are managed by the MPT engine 128.

FIG. 1 describes a computer system with a single CPU with a single core for ease of explanation, though another, more complex, embodiments is illustrated below in FIG. 3. Returning to FIG. 1, CPU 102 is generally coupled to a system board (i.e., a motherboard). The motherboard, though not shown in FIG. 1, may include a socket designed to secure contact between each external power and communication pin originating from CPU 102 with other components in the computer system. This socket will essentially communicatively couple all circuitry integrated into the CPU 102 with components such as system memory (e.g., general storage 140), the I/O complex 112, and other additional components that are not shown. In many instances, the allocation of system resources such as memory may be based on a per-socket layout. Thus, CPU and socket may be utilized interchangeably when referring to system setup, unless otherwise noted.

Figure 2:
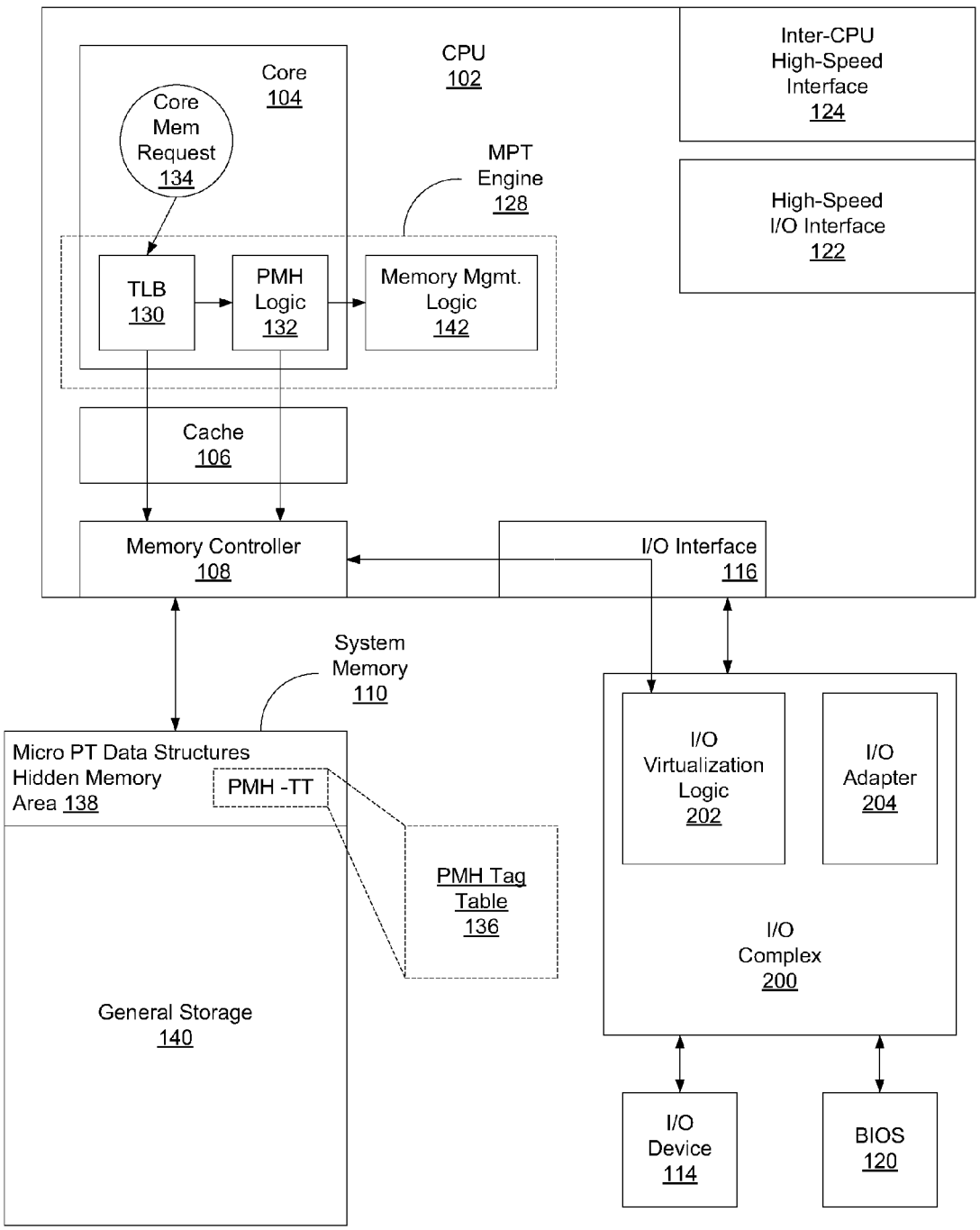
FIG. 2 describes an additional embodiment of a computer system implementing micro-page tables.
Figure 3:
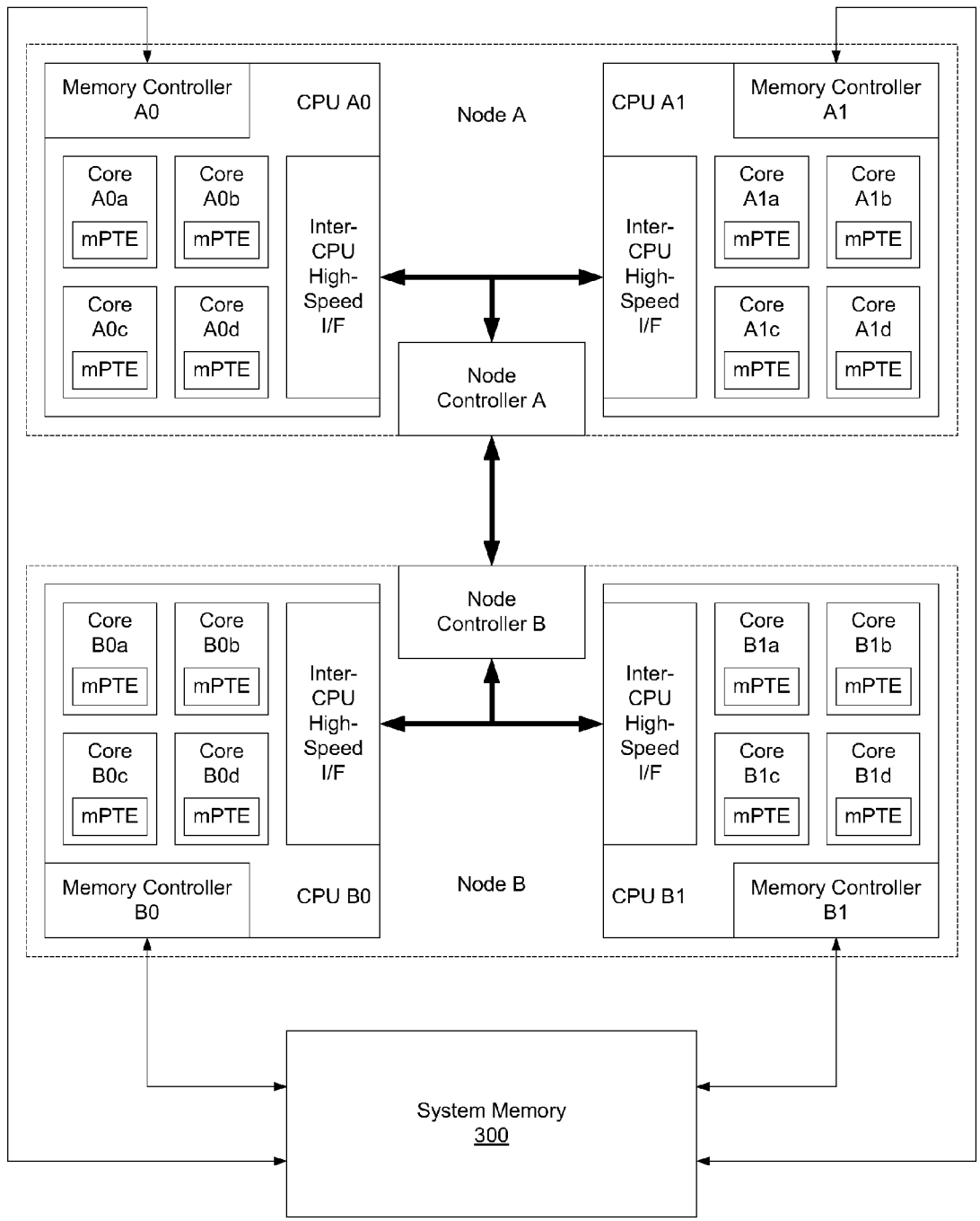
FIG. 3 describes another embodiment of a computer system implementing micro-page tables.

Other embodiments of computer systems implementing micro page tables are shown in FIG. 2 and FIG. 3.

FIG. 2 describes an additional embodiment of a computer system implementing micro-page tables.

The computer system illustrated in FIG. 2 is similar to the computer system shown in FIG. 1 except that the I/O complex and circuitry integrated into the I/O complex is an external I/O complex 200 discrete from CPU 102. In many embodiments, I/O virtualization logic 202 and I/O adapter 204 are both integrated into the discrete I/O complex 200. The functionality of these components may be the same as described above in FIG. 1 regarding I/O complex 112, I/O adapter 118 and I/O virtualization logic 126, only their at a different location within the computer system. In yet other embodiments that are not shown in FIG. 1 and FIG. 2, the I/O Complex 200 may partially be implemented on the CPU 102 die and partially implemented external to the CPU 102.

FIG. 3 describes another embodiment of a computer system implementing micro-page tables.

The computer systems illustrated in FIG. 1 and FIG. 2 are limited to showing a single CPU with a single core. As stated, this is done for illustrative purposes. In many embodiments, a computer system implementing micro-page tables may be a computer with many cores and many CPUs. For example, FIG. 3 illustrates a computer system with four CPUs (A0, A1, B0, and B1). CPUs A0 and A1 reside within node A and CPUs B0 and B1 reside within node B. All four CPUs communicate with each other over a high-speed inter-CPU interface (I/F). Between nodes, the high-speed interface is routed through node controllers for each node (node controllers A and B).

In the embodiment shown in FIG. 3, each CPU includes four distinct cores (cores A0*a*, A0*b*, A0*c*, and A0*d* are in CPU A0; cores A1*a*, A1*b*, A1*c*, and A1*d* are in CPU A1; cores B0*a*, B0*b*, B0*c*, and B0*d* are in CPU B0; and cores B1*a*, B1*b*, B1*c*, and B1*d* are in CPU B1). At least a portion of the logic for a MPT engine resides within each of the 16 cores.

In many embodiments, there is a single global system memory 300 that every CPU has access to. Although not shown, there may be a hidden memory area (138 in FIG. 1) within system memory 300. Furthermore, additional components within each CPU (e.g., a cache) are not shown in FIG. 3 for the sake of clarity of the figure.

Figure 4:
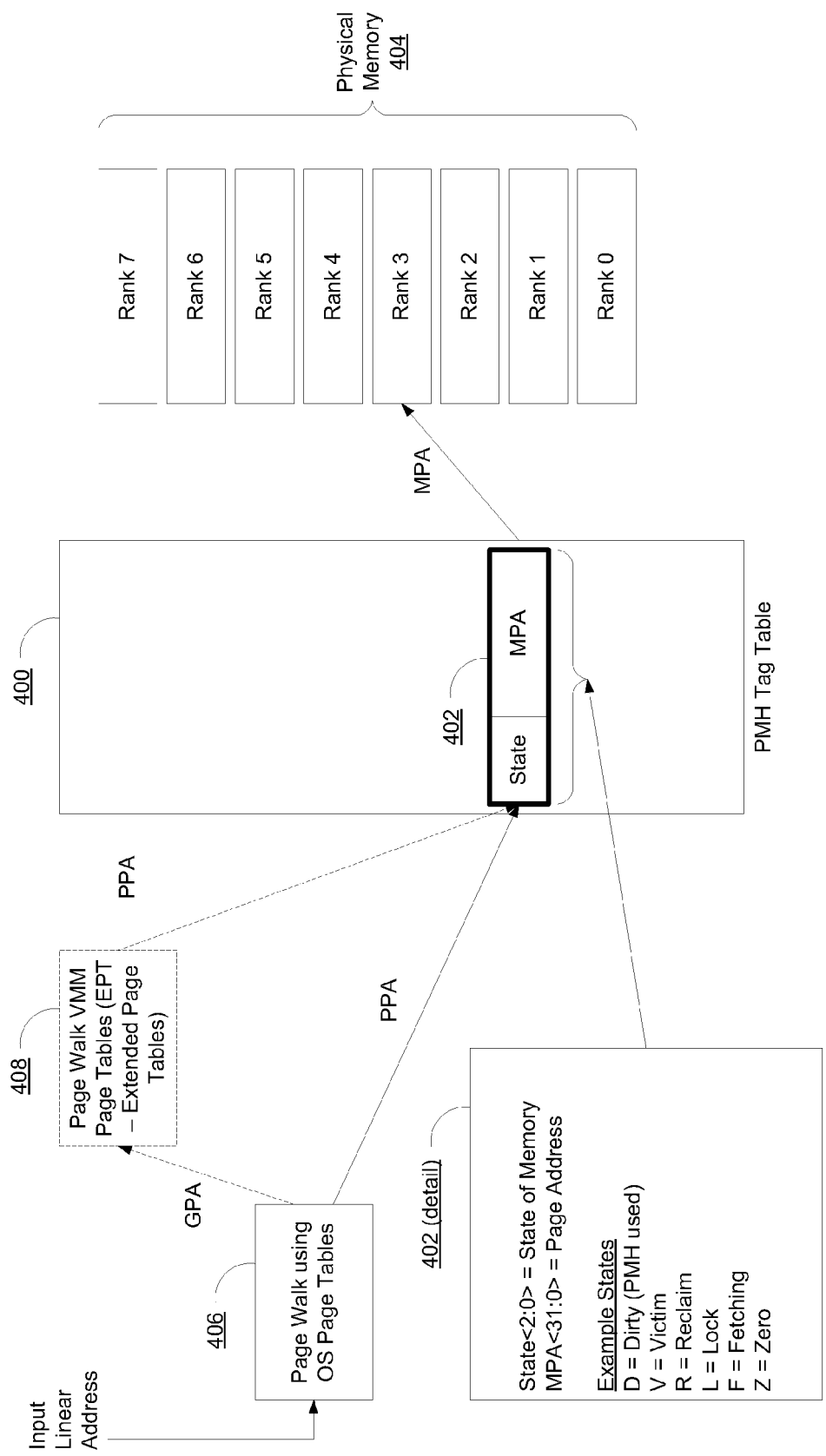
FIG. 4 illustrates an embodiment of the page miss handler tag table.

FIG. 4 illustrates an embodiment of the page miss handler tag table. In many embodiments, the PMH-TT 400 stores an entry 402 for each page in all of physical memory 404. As shown in FIG. 4, physical memory 404 many times is made up of multiple ranks (such as ranks 0-7). Each PMH-TT entry (e.g., 402) includes a MPA that references a specific page in one of the ranks of physical memory 404. In some embodiments, the entry 402 also includes state information to store a current state of the memory at the MPA. For example, FIG. 4 shows some examples of details of the entry 402. In FIG. 4, the state includes 3 bits and certain combinations of these bits may show the entry in different states, such as the listed states of dirty, victim, reclaim, lock, fetching, zero, etc. Many of these example states will be explained in greater detail below with regard to different focused MPT embodiments. In other embodiments, the state may not be a simple encoding where 3 bits are capable of signifying 8 states, but rather there may be one or more separate bits for each of the states (though this embodiment is not shown).

Returning to the page look-up illustration shown in FIG. 4, an address request arrives at the MPT engine (128 in FIG. 1) logic. For example, the linear address may be an address request from an OS. If there is no virtualization on the platform, the page walk will produce a platform physical address (PPA), which was discussed above. The PPA may be used as an index into the PMH-TT 400 to retrieve the relevant entry containing the micro physical address (MPA), which refers directly to a location in physical memory (e.g., a physical memory page address).

On the other hand, if there is a level of virtualization on the platform, which may include one or more virtual machines as well as a virtual machine manager (VMM), an intermediary page walk through a set of VMM-maintained page tables is additionally taken. Specifically, in this embodiment, the page walk through the OS maintained page tables 406, refers to walking through the page tables known to a VM that the OS supplying the linear address is running on. In this case, the address produced from the linear address page walk refers to a guest OS physical address (GPA). The GPA does not index directly into the PMH-TT because there is a VMM layer below the guest OS that manages its own set of page tables unbeknownst to the guest OS running on one of possibly many virtual machines present in the platform. Generally, VMM page tables are referred to as extended page tables (EPT) and the GPA would then be used as an index for a page walk through the EPT to produce the PPA to index into the PMH-TT 400. This additional page walk step is generally standard when dealing with a virtualized platform.

In either case, once the PPA has been produced, it is utilized as the index into the PMH-TT 400 to find the entry containing the MPA that directly references physical memory 404.

To allow memory to be virtualized for all software in the manner described above, the memory and the data structures supporting the MPT engine need to be initialized. In many embodiments, during a boot of the computer system, the BIOS provides the computer with a set of instructions to initialize many of the components present in the system.

In many computer systems, an important aspect of the BIOS is the Memory Reference Code (MRC). The MRC relates to memory initialization and includes information about memory settings, frequency, timing, driving and detailed operations of the memory controller. To support MPT, the BIOS in the computer system may be updated to publish CPU-socket specific memory address regions. This may include publishing the physical address range scope of each memory rank present in the system as well as initially hiding a portion of the system memory (hidden memory area 130 in FIG. 1) from all software to implement the PMH-TT 400 as well as other MPT data structures, which will be detailed below. For the PMH-TT 400 specifically, an identity map may be utilized for initialization purposes.

In many embodiments, the mapping of the PPA to the MPA is a fully associative mapping. Thus, a given PPA may index into exactly one location within the entire PMH-TT 400, but the entry at that location may map to any arbitrary MPA location in memory.

This extra level of indirection is hidden in hardware so a guest OS, a VM, a VMM, a hypervisor, or potentially any other software construct operating on the platform may be completely unaware of the extra layer of translation. In other words, from a software point of view, the PPA is thought to be the actual physical address indexing a page of memory. Instead, when the PMH-TT 400 is implemented, the MPA is the true physical address into memory. The additional indirection layer can allow for many applications otherwise considerably less efficient or possibly unachievable when limited to software solutions.

Micro Page Table Rank Shedding

Figure 5:
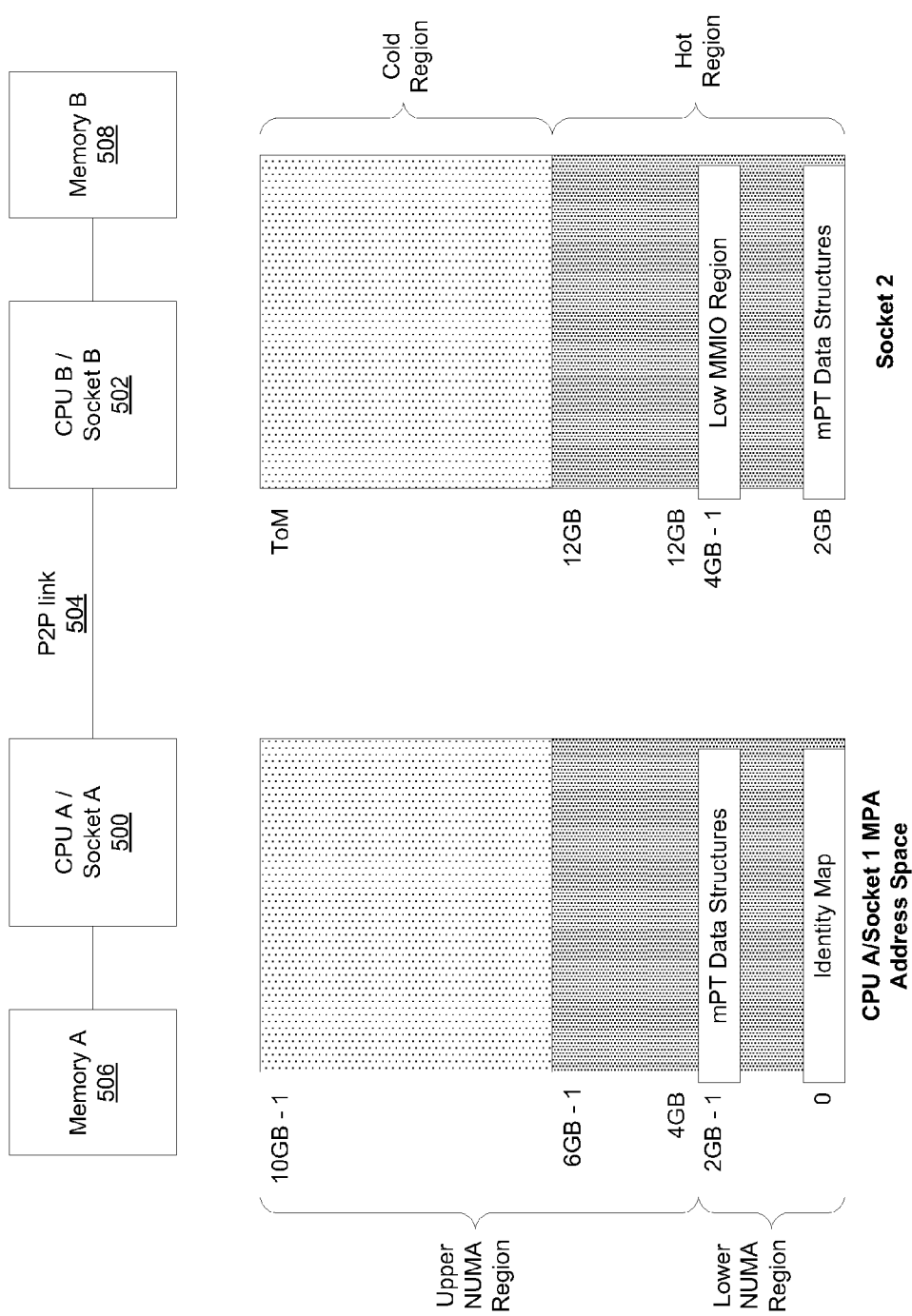
FIG. 5 illustrates an embodiment of a computer system implementing micro page tables for rank shedding.

FIG. 5 illustrates an embodiment of a computer system implementing micro page tables for rank shedding.

Rank shedding involves allowing ranks of memory to be prioritized in usage. There are multiple reasons why rank prioritizing may be implemented. For example, in many embodiments, it is not always efficient from a power perspective to utilize all system memory ranks in a computer system simultaneously. For example, in a server, there may be many ranks of memory that are available but the server may not currently be in use or at least not in high use. In this scenario, the workload present on the server may not show a performance degradation if a subset of the memory ranks in the system are used. Thus, it may be achievable to prioritize the usage of certain ranks over others and, in lower usage periods, certain low priority ranks present in the memory subsystem can then be disengaged from active use. Disengaging a rank from active use may allow a memory subsystem power management scheme to put the non-used rank into a lower power state for a length of time, thereby lowering the power consumption of the entire computer system.

In other embodiments, an interleaved memory access architecture is present instead of a NUMA architecture. Thus, generally there are no constraints on the configuration of memory and configurations will vary according to implementation. For example, in some embodiments, there may be multiple CPUs sharing a single DIMM. In other embodiments, there may be multiple DIMMs in use for each CPU. In yet other embodiments, there may be a 1-to-1 correlation between the number of DIMMs and the number of CPUs.

Turning to FIG. 5 an embodiment of a multi-CPU socket computer system implementing rank shedding is shown.

CPU A 500 is coupled to CPU B 502 across point-to-point link 504. CPU A 500 is also coupled directly to memory A 506 and indirectly to memory B 508 (through link 504 and CPU B 502). CPU B 502 is coupled directly to memory B 508 and indirectly to memory A 504 (through link 504 and CPU A 500). When utilizing memory for a workload, it generally is more efficient if CPU A 500 were to utilize memory A 506 and if CPU B 502 were to utilize memory B 508. This is due to locality of the memory per CPU in the NUMA environment. Thus, in many embodiments, CPU A may prioritize usage of memory ranks located in memory A 506 and CPU B may prioritize usage of memory ranks located in memory B 508.

In many embodiments, rank shedding may assist in implementing the prioritization of ranks per CPU (this can also be referred to as "per socket" since each CPU is coupled to system board by its own socket). The prioritization of ranks per socket is accomplished by utilizing an MPT engine in each CPU to dynamically prioritize the ranks used by that CPU. MPA address space spans all sockets. Thus, the range of address space that all sockets see is the same, but different portions of the address space may be prioritized per socket.

For example, in the two socket system shown in FIG. 5, CPU A has the CPU A/Socket 1 MPA address space as shown below it. This shows that from address 0 to address 2 Gigabyte (GB)-1, socket 1's lower NUMA region, is in the hot region for socket 1. CPU B has the CPU B/Socket 2 MPA address space that shows addresses 2 GB to 4 GB-1, socket 2's lower NUMA region, is in the hot region for socket 2.

Specifically, the first 4 GB of memory is the lower NUMA region. The first two gigabytes being mapped to socket 1 and the second two gigabytes being mapped to socket 2. In the embodiment shown in FIG. 5, there is additional address space above 4 GB. For an even split of address space, the upper NUMA region may be divided equally among all sockets. Furthermore, the upper NUMA region would equal Top of Memory (ToM) minus Top of lower NUMA region (e.g., 4 GB). In the embodiment shown in FIG. 5, there is 16 GB of total address space and the lower NUMA region is 4 GB. Thus the top 12 GB (16 GB-4 GB) is in the upper NUMA region. Then the 12 GB is divided by two to distribute the upper NUMA region among the two sockets, so each socket has 6 GB of addressable upper NUMA region address space. Therefore, socket 1 may be allocated address space from 4 GB up to 10 GB-1 and socket 2 may be allocated address from 10 GB to the top of memory, which in this example is 16 GB-1.

The size of the hot and cold regions may differ over time based on usage conditions. In the example shown in FIG. 5, at the time the snapshot of memory is made, the hot region comprises half of the total address space and the cold region comprises the other half. Thus, the upper NUMA region for socket 1 has addresses 4 GB to 6 GB-1 in the hot region and 6 GB to 10 GB-1 in the cold region and socket 2 has addresses 10 GB to 12 GB-1 in the hot region and 12 GB to 16 GB-1 in the cold region. It should be appreciated that the size of each respective NUMA region, the size of memory, and the number of sockets may change in different embodiments.

Additionally, since the hot and cold regions of memory can potentially be dynamically adjustable, the sizes of each socket's hot and cold regions are also variable. Although there are hot and cold regions for each socket, the variability of the sizes per socket may be symmetric or asymmetric. For example, in certain situations the sizes of the hot and cold regions for each socket are always the same across sockets. Thus, if the hot region expands from 25% to 50% of addressable memory, this change may be done for all sockets simultaneously (symmetric treatment across sockets). On the other hand, in other situations, the size of the hot and cold regions for each socket are separately maintained (asymmetric treatment across sockets). For example, if socket 1 has a heavy workload and socket 2 has a light workload, the hot region of socket 1 might span a higher percentage of socket 1's addressable memory space than the respective hot region for socket 2's addressable memory space.

Generally, the identity map for the PMH-TT is stored in a hot region of memory address space and the MPT data structures themselves, including the PMH-TT, are also stored in a hot region of memory address space. In many embodiments, the data structures span the hot region for each of the two sockets, as shown in FIG. 5.

Figure 6:
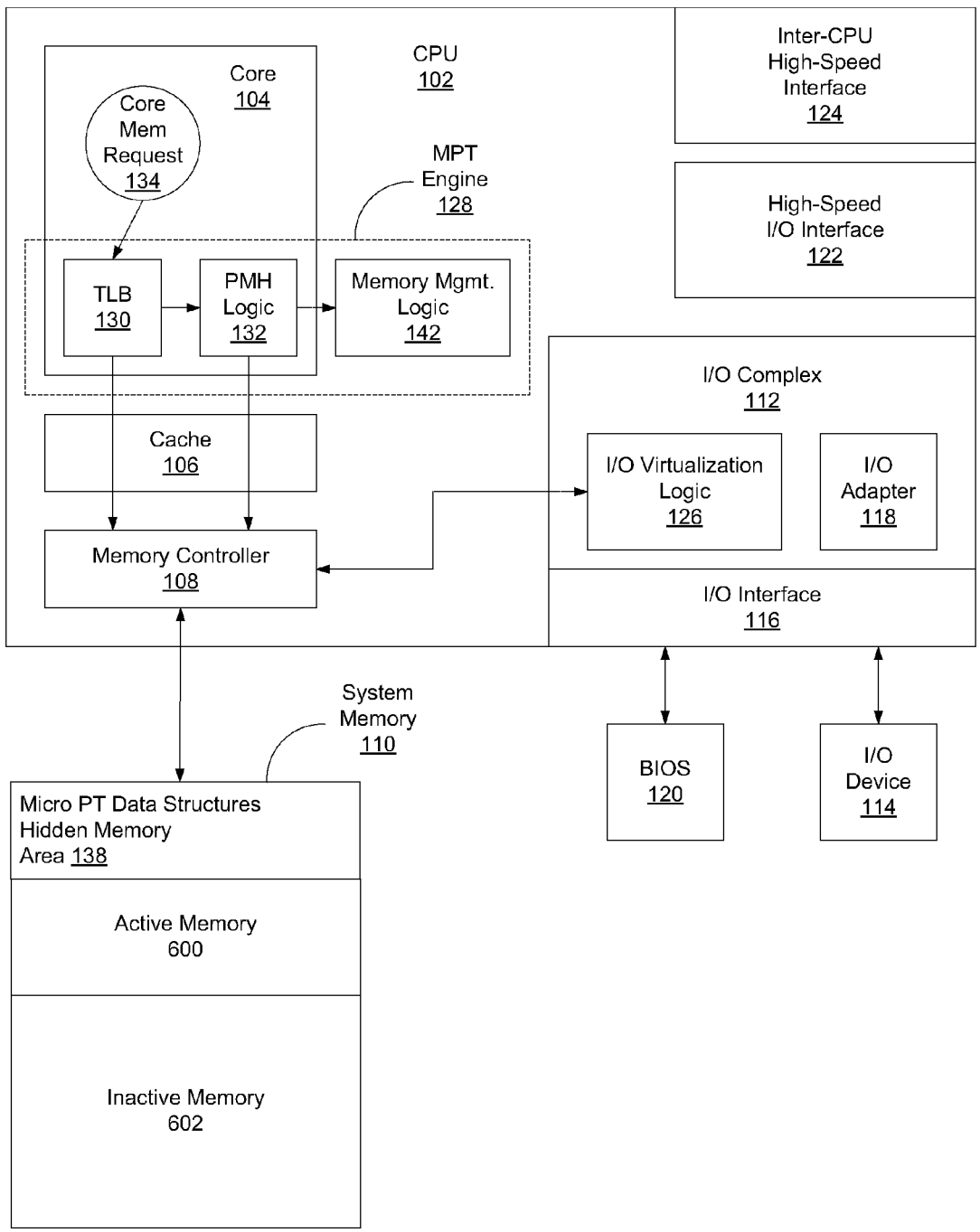
FIG. 6 illustrates an embodiment of a computer system implementing micro page tables utilized at least in part for rank shedding.

FIG. 6 illustrates an embodiment of a computer system implementing micro page tables utilized at least in part for rank shedding. The computer system in FIG. 6 is similar to the computer system illustrated in FIG. 1. All major components are utilized in a similar manner and may be referenced in the description above. FIG. 6 adds rank shedding implementation specific partitions in the system memory 110. An active memory 600 partition and an inactive memory partition 602 are shown. The active memory 600 partition includes those ranks of memory that are presently utilized by CPU 102 (i.e., the hot region of address space). Whereas the inactive memory 602 partition includes those ranks of memory that are presently not utilized by CPU 102 (i.e., the cold region of address space).

As more ranks are brought into use, the active memory 600 partition will increase, and as less ranks are used, the inactive memory partition 602 will increase. The granularity of potential change in size between the active and inactive memory portions is implementation specific. For example, if rank shedding is utilized for power management, the granularity of change in active vs. inactive ranks may mirror the number of ranks that can be separately managed for power. If there are 16 ranks in system memory and these ranks are coupled to power planes on a system board in groups of 4, it may mean that at any given time, 0, 4, 6, 12, or 16 ranks may be active and vice versa for the inactive ranks. On the other hand, if there is a finer granularity for power supply within system memory, there may be more options. If each rank is able to be controlled with separate power then there may be 16 different combinations of active versus inactive memory portions.

It may also be possible to focus the granularity on a memory module basis, which would allow all the memory coupled to the system board through a single module (e.g., a DIMM) to be power managed as a group.

On the other hand, active and inactive ranks may be managed per CPU on the basis of performance in a NUMA-based system. For example, returning to FIG. 5, in a two CPU system, memory A 506 is local to CPU A 500, so the address space representing memory A 506 may initially be designated as active memory for CPU A 500. Whereas, memory B 508 is remote to CPU A 500, so the address space representing memory B 508 may initially be designated as inactive memory for CPU A 500. Although if a workload requires increased memory usage for CPU A 500, memory B 508 may have portion of its designation switched to active memory. This utilization of local memory address space may hold true for CPU B 502 as well using memory B 508 as active memory and memory A 506 and inactive memory initially.

Figure 7:
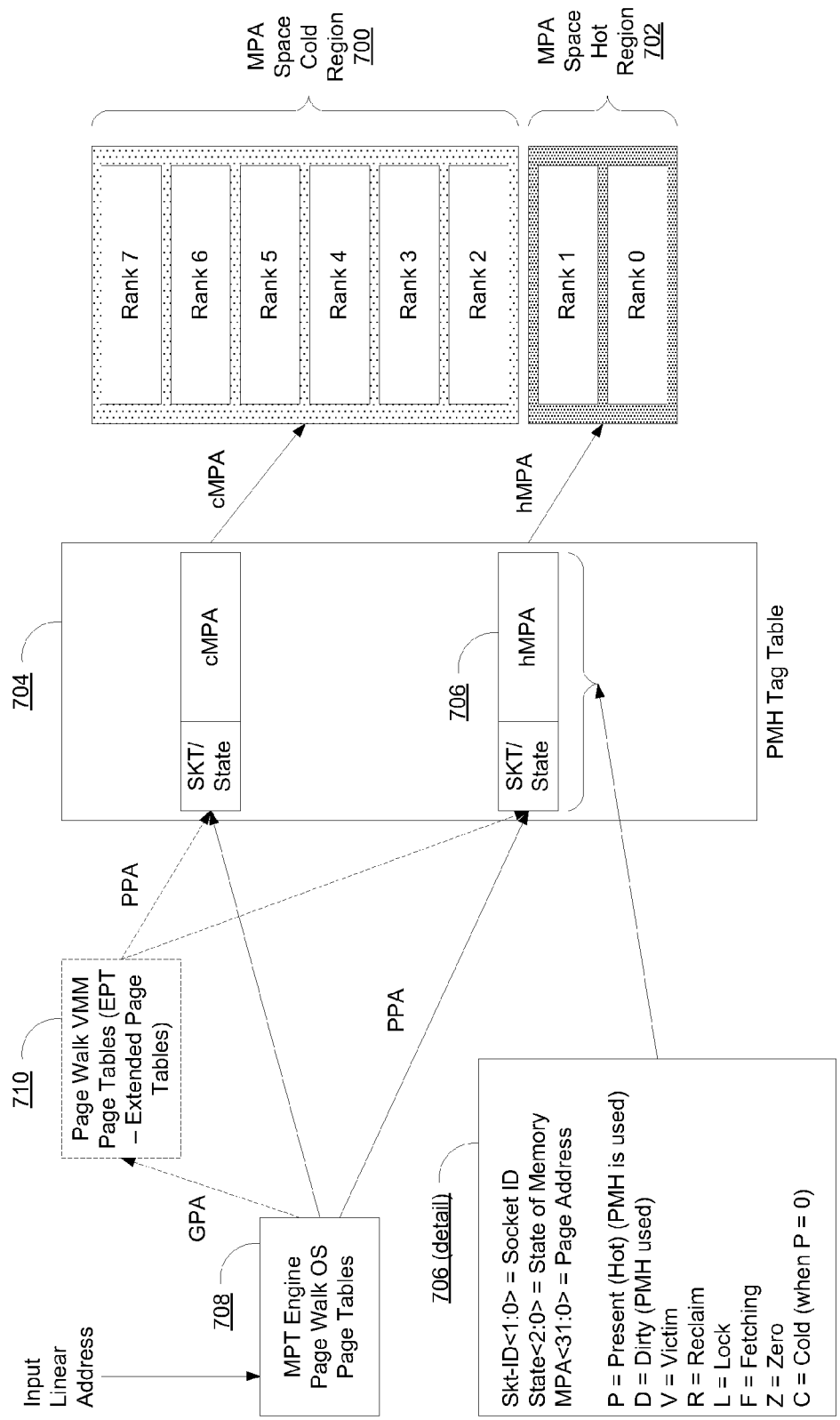
FIG. 7 illustrates an embodiment of the page miss handler tag table when implemented at least in part for rank shedding.

Turning now to FIG. 7, this figure illustrates an embodiment of the page miss handler tag table when implemented at least in part for rank shedding.

The page walking process to get from the initial input linear address to the MPA is similar to the process described and illustrated in FIG. 4. Major steps in the process are completed in a similar manner and may be referenced in the description above. FIG. 5 includes additional rank shedding implementation details.

Physical memory, shown at right in FIG. 7 (i.e., ranks 0-7), comprises a micro page address (MPA) space cold region 500 and a MPA space hot region 502. The cold region may be considered the inactive memory region and the hot region may be considered the active memory region. Thus, ranks 0 and 1 are presently active and ranks 2-7 are presently inactive.

One possible state utilized in the state information shown in 702 detail is a "cold" bit. This bit can indicate, for each entry in the PMH-TT 704, whether that entry is indexing into a cold region of MPA space or a hot region of MPA space. During initialization of the system, each entry in the PMH-TT 704 corresponding to ranks in the cold region can be initially set as a cold MPA (cMPA) using the cold bit (e.g., cold bit="1"). And the rest of the entries may be set as a hot bit (e.g., cold bit="0" or present bit="1").

When the system first is booted, there may be an initial state for each rank as to whether that rank (and all MPA entries it comprises) is within the cold region or hot region of overall system memory. As usage patterns change for memory during operation (e.g., heavy memory workload, light memory workload, idle, etc.) the MPT engine logic may decide to shrink or expand the hot region of memory 702. Thus, the hot and cold regions of memory may be dynamically adjustable during system operation. This could potentially be based on a performance policy (i.e., as performance degrades, the hot region expands to compensate) or a power policy (during system idle more ranks are added to the cold region for potential use of a low power mode to at least a part of the memory subsystem. Apart from these scenarios, there are many other potential uses for shedding ranks of a memory.

The hot and cold MPA translations have no bearing on whether the system is using virtualization and requires an additional GPA→PPA page walk step. The figure is shown specifically that way just for illustrative purposes of a single example.

In many embodiments, only hot page translations are stored in the TLB. Thus, when there is a request to access a physical page at an MPA address that is in a cold region of memory, a rank shedding miss takes place. Because hot pages are specifically utilized for general access by a CPU or other bus master device, the data stored in the requested page is then moved from the cold page to a hot page of memory. In many embodiments, the hot region of memory always maintains at least a certain percentage of the total hot space as free memory pages to be utilized in a data swap when data from a cold page is needed to be accessed. This percentage of free hot pages may range from a very small percentage of total hot pages (e.g., one free hot page) up to a significant percentage of the entire range of hot pages (e.g., 10% of the total number of hot pages are free).

Figure 8:
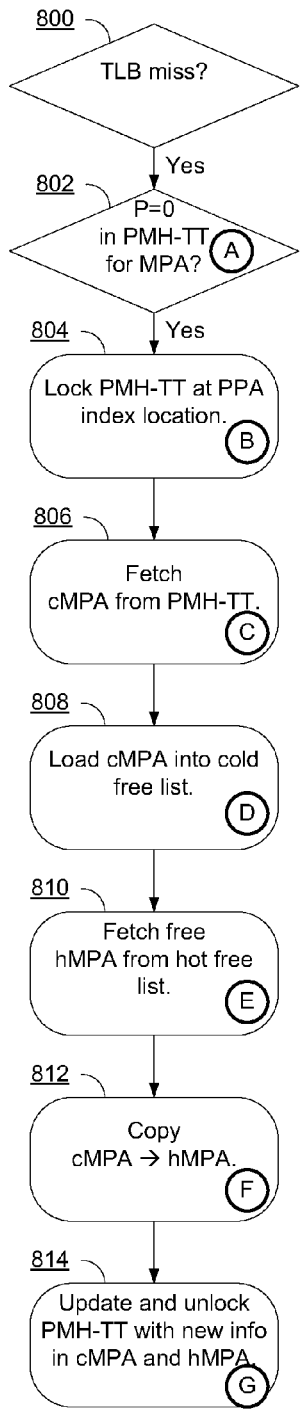
FIG. 8 is a flow diagram of an embodiment of a process used handling a hot page miss.
Figure 9:
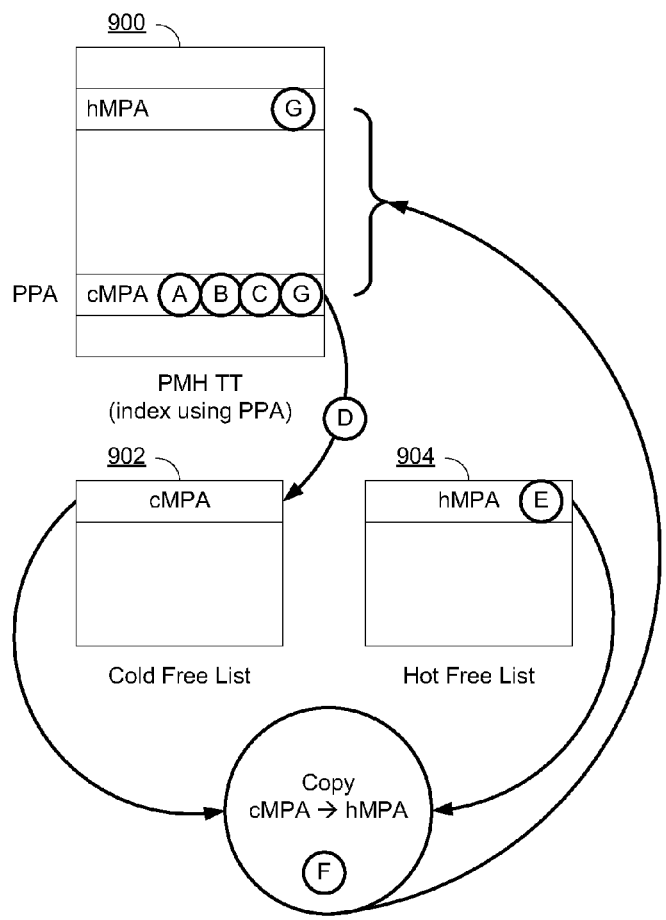
FIG. 9 illustrates an embodiment of some of the additional micro page table data structures utilized by the micro page table engine when reacting to a hot page miss.

FIG. 8 is a flow diagram of an embodiment of a process used handling a hot page miss and FIG. 9 illustrates an embodiment of some of the additional micro page table data structures utilized by the MPT engine when reacting to a hot page miss. To be clear, a hot page miss is simply a memory page request to a physical page that is in a cold region of memory. FIG. 8 is related to FIG. 9. Specifically, the process illustrated in FIG. 8 shows how the MPT engine logic handles a hot page miss by utilizing the data structures shown in FIG. 9. The process illustrated in FIG. 8 may be performed by processing logic related to the MPT engine. This processing logic may comprise hardware, software, firmware, or any combination of those three forms of logic. Furthermore, throughout FIG. 8 and FIG. 9, there are small circles designated with letters (e.g., A, B, C, etc.). These letter-designated circles are items of interest as to what data structures and data transfers are utilized by processing logic while it is performing the block-by-block process flow in FIG. 8.

Turning now to FIG. 8, the process begins by processing logic determining whether a received memory request is targeting a page of memory that is not in the TLB (processing block 800). As described above, the TLB, in many embodiments, does not store cold page translations, thus if there was a TLB hit, in these embodiments it would be inherent that the requested memory page already resides within the hot region of memory. If there is a TLB hit then this process is finished since processing logic would not be dealing with a hot page miss. Processing block 800 is utilized because although processing block 802 will determine whether the requested memory page is in the hot or cold region, processing block 802 requires additional lookup time which would not be necessary if there was a TLB hit.

Continuing with the process (assuming there is a TLB miss), next processing logic determines specifically whether the requested memory page is in a hot or cold region by checking the status information associated with the page in the PMH-TT (900 in FIG. 9) (processing block 802). This determination requires a lookup of the physical page of memory in the PMH-TT 900. The lookup is described in detail in FIG. 7 above. Specifically, processing logic utilizes the PPA of the memory page request to index into the PMH-TT 900 to find the specific entry.

The specific entry includes the MPA as well as the state information for that particular memory page. In some embodiments, the state information includes a present bit (P), which may indicate that the memory page is in the hot region if the P bit is set (P=1) or indicate that the memory page is in the cold region if the P bit is cleared (P=0) using the PPA of the requested memory page. In many other embodiments, a cold bit (C) is additionally utilized, which may indicate the memory page is in the cold region if the C bit is set (C=1) or indicate that the memory page is in the hot region if the C bit is cleared (C=0). For example, as shown in the process of FIG. 8, processing logic determines if P=0. Processing logic determines this by looking within PMH-TT 900 at the PPA index location (item A).

If the P bit is cleared (P=0), then processing logic locks the PMH-TT 900 at the PPA index location (processing block 804). The PMH-TT 900 needs to be locked to allow processing logic to initiate a cold-to-hot memory page transfer. If the PMH-TT 900 is not locked at the PPA index location, corruption of the cold-to-hot transition may ensue, for example due to another entity simultaneously attempting a similar access. In many embodiments, the lock can be accomplished by setting the state information bits at the PPA index location (item B) in the PMH-TT 900 to "Fetching" (F=1).

Then, processing logic fetches the cMPA from the PMH-TT 900 (processing block 806). [In many embodiments, this fetching procedure fetches the data from the cMPA memory location (item C). The data may be placed within buffer logic for temporary storage.] Next, processing logic loads the cMPA physical memory page address into a cold free list (processing block 808), in other words, the cMPA address in PMH-TT 900 is copied to cold free list data structure (902 in FIG. 9) illustrated by data transfer D in FIG. 9. The cold free list stores physical memory page addresses that were in the cold region of memory but have been the target of a memory request and thus the data in the page has required a transfer to a hot memory region page. Once the cold region page no longer is required to continue to hold the data (because a copy of the data has been copied into a buffer), then the cold page of memory is free to be overwritten and therefore its address is placed into the cold free list.

Figure 10:
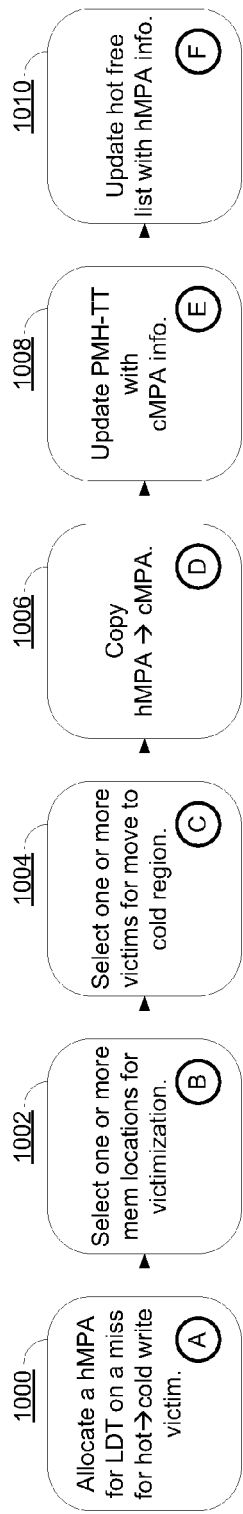
FIG. 10 is a flow diagram of an embodiment of a maintenance process to provide a number of memory pages with the capability of being utilized as hot pages during a cold-to-hot memory page data transfer.
Figure 11:
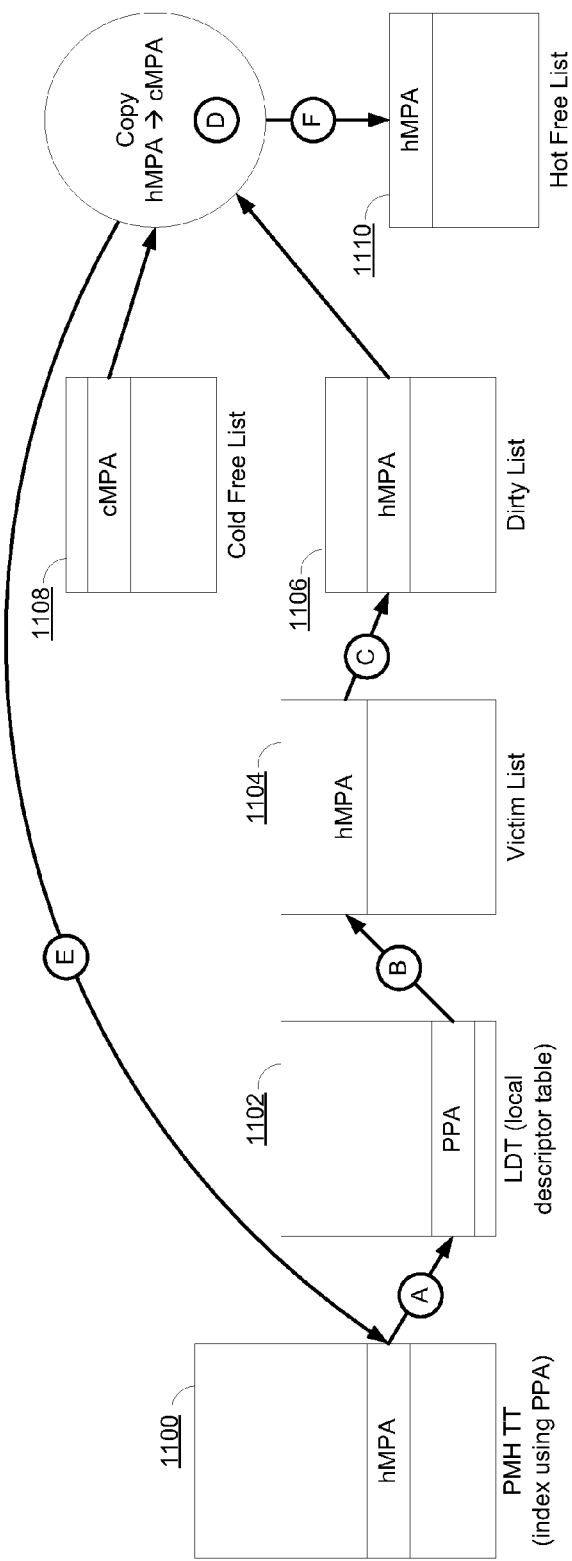
FIG. 11 illustrates an embodiment of some of the additional micro page table data structures utilized by the micro page table engine during the maintenance process.

Processing logic then fetches a free hMPA physical memory page address (item E in FIG. 9) from the hot free list data structure (904 in FIG. 9) (processing block 810). The hot free list includes hot region memory pages that are available to be written to for this process. FIG. 10 and FIG. 11 below describe how the hot free list 904 is populated. Processing logic then copies the data from the cMPA memory page to the hMPA memory page (processing block 812 and item F in FIG. 9). Once the cold-to-hot memory page data transfer has taken place, then processing logic updates and unlocks the PMH-TT 900 (processing block 814 and item G in FIG. 9).

In many embodiments, the PMH-TT 900 update sets the state information to present (P=1) and not fetching (F=0) for the memory page at the hMPA address to unlock and update the page. Additionally, prior to this process, this hot region memory page at the hMPA address was in the hot free list because it was available to be used for a cold-to-hot transfer, though now because it has been used for the transfer, the page is in use and no longer free. Thus, processing logic removes the hMPA address from the hot free list 904.

Turning now to FIG. 10 and FIG. 11, FIG. 10 is a flow diagram of an embodiment of a maintenance process to provide a number of memory pages with the capability of being utilized as hot pages during a cold-to-hot memory page data transfer and FIG. 11 illustrates an embodiment of some of the additional micro page table data structures utilized by the MPT engine during the maintenance process. FIG. 10 is related to FIG. 11. Specifically, the process illustrated in FIG. 10 shows how the MPT engine logic proceeds through the maintenance methodology by utilizing the data structures shown in FIG. 11. The process illustrated in FIG. 10 may be performed by processing logic related to the MPT engine. This processing logic may comprise hardware, software, firmware, or any combination of those three forms of logic. Furthermore, similar to FIG. 8 and FIG. 9, throughout FIG. 10 and FIG. 11 there are small circles designated with letters (e.g., A, B, C, etc.). These letter-designated circles are items of interest as to what data structures and data transfers are utilized by processing logic while it is performing the block-by-block process flow in FIG. 10.

The process in FIG. 10 begins by processing logic allocating a hMPA for a local descriptor table (LDT) on a hot page miss (processing block 1000 and item A). The LDT (1102 in FIG. 11) contains a subset of the entries in the PMH TT (1100 in FIG. 11). The specific subset of entries in the LDT are those that are actually in use (i.e., the "Present" or "Hot" bit is set). Generally, the LDT 1102 allows a quick lookup for logic to determine if an entry is present. Without the LDT 1102, the PMH TT would need to be searched to determine if the entry in question is present because in the PMH TT, all memory address space locations are referenced, which that in many embodiments, a majority of the PMH TT entries are going to be empty (i.e., "Present" or "Hot" bit is cleared). The hot page miss, as described in detail above in FIG. 8 and FIG. 9 is determined once the MPA address from the tagtable lookup is found with P=0 in the state information (and/or C=1) at the PPA index location in the PMH-TT (processing block 1000 and item A in both FIG. 10 and FIG. 11). The data at the hMPA that is designated to transition from the hot page to a cold page in the PMH-TT (1100 in FIG. 11) may be allocated on a hot page miss (described above in regard to FIG. 8 and FIG. 9. The LDT (1102 in FIG. 11) is indexed using MPA addresses. Specifically, the allocated hMPA is used as an index into the LDT 1102 to find the PPA. Thus, while the PMH-TT 1100 stores physical MPA addresses and is indexed using a PPA address, the LDT 1102 is the opposite because it stores PPA addresses and is indexed using a physical MPA address.

In different embodiments, the allocation of the slot in the LDT 1102 may happen on each hot page miss or in another manner such as several slots being allocated at once after a certain number of hot page misses. At a certain time after the PPA memory location is stored in the LDT 1102, the MPT engine processing logic will select one or more PPA memory locations in the LDT 1102 for victimization (processing block 1002 and item B in FIG. 10 and FIG. 11). Rank shedding victimization is the process of moving data stored in a hot page of memory into a cold page of memory so the hot page of memory may be freed for a future required cold-to-hot page transfer.

The selection process for victimization can be one of several embodiments. For example, the MPT engine processing logic may track how long it has been since each hot page has been accessed by the CPU or another entity and based on that data, victims may be include those hot pages that have been inactive for the longest time. In another example, the MPT engine processing logic may track the locality of data and keep data in hot pages that are actively being utilized as well as being clustered together in relatively adjacent physical memory page locations and victimize other hot pages that are not near hot page clusters. Although not discussed, many other types of victimization algorithms may be performed by the MPT engine processing logic.

In many embodiments, LDT 1102 slots are selected for victimization by processing logic setting the state information victim bit of the page to V=1. When V is set to "1" either that may prompt logic to transfer the hMPA to a victim list 1104 structure for storage or processing logic may initiate the transfer to the victim list 1104 by other means and change the victim bit to "1" after the transfer is complete. The victim list 1104 is used to store a set of victimized physical memory page addresses designated for a hot-to-cold region transitions. Though designated as victims, MPT engine processing logic can reclaim any given victim page in the victim list 1104 by clearing the victim bit (V=0) and setting the reclaim bit (R=1) in the PMH-TT 1100 and removing the victim list 1104 entry for the page. The process of reclaiming a victim page allows a CPU or an I/O DMA access an active page with a translation currently in the TLB. This allows a page to be claimed without going through a TLB miss lookup process.

The victims may sit in the victim list 1104 as long as there is room and/or there are a sufficient number of free hot pages available. At a certain point, the victim list 1104 may grow to the point that the number of victims in the list surpasses a threshold value or the number of free hot pages falls below another threshold value. Once one of these thresholds has been passed, MPT engine processing logic then may process a significant number of victim page data transfers to cold space. This hot-to-cold data transfer is done because data in a hot region memory page must first be transferred to data in a cold region memory page before that hot region memory page can be deemed "free."

Thus, returning to FIG. 10, MPT engine processing logic will select one or more victims from the victim list 1104 for a data transfer move to the cold region of memory (processing block 1004 and data transfer item C in FIG. 11). A TLB shootdown is required when moving an entry from the victim list 1104 to the dirty list 1106. Therefore, it is generally more efficient if the TLB shootdown processes a group of pages together rather than for each page to limit the times in which the system is slow due to the TLB shootdown process. TLB shootdowns require inter-processor interrupts to flush the TLB lookup translations affected. After the TLB shootdown for a memory page, the entry for that MPA physical memory page in the victim list 1104 can be transferred into the dirty list 1106. This transfer also involves modifying the state information for each entry to clear the victim bit (V=0) and set the dirty bit (D=1). As discussed above, in many embodiments, only hot page translations are cached in the TLB, thus although hot-to-cold region data transfers from a hMPA to a cMPA require a TLB shootdown, a cold-to-hot move does not require a TLB shootdown.

These TLB shootdown-processed page entries that are stored in the dirty list can also be reclaimed by a CPU or an I/O DMA access. Again, the reclaiming process simply requires removing the page entry in the dirty list and updating the PMH-TT 1100 entry for that particular page to clear the dirty bit (D=0) and set the reclaim bit (R=0). Thus, both victim and dirty list entries are capable of being reclaimed. An entry that is reclaimed refers to an entry that can be used as if it was never victimized, once the state bits are updated.

At a given time, each entry in the dirty list 1106 needs to have its data copied from the hMPA memory page location to a selected free cMPA memory page location from the cold free list 1108 (processing block 1006 and item D in FIG. 11). As mentioned above, this creates a copy of the data which has been stored in the hMPA page in a free cMPA page to allow the hMPA page to be freed for future use. Once the data transfer to the cold region of memory takes place, then processing logic updates the PMH-TT 1100 with the new cMPA information (processing block 1008 and item E in FIG. 11). The PMH-TT 1100 update utilizes the LDT 1102 to set the index of the utilized cMPA to the copied hMPA's PPA index. This essentially remaps the PMH-TT 1100 entry so a lookup of that PPA address will now point to the utilized cMPA that now has the copy of the data rather than point to the old hMPA.

Finally, MPT engine processing logic will then update the hot free list 1110 with the hMPA info (processing block 1010 and item F in FIG. 11). With the data that was stored in the memory page at the hMPA address now safely stored in the new cMPA page, the hMPA page is now free to be used as a free hot memory region page. Thus, the hMPA entry is stored in the hot free list 1110 for this reason. Hot free list 1110 pages are no longer in the TLB. This allows for a reduction on the number of TLB shootdowns because a needed hot page grabbed from the hot free list does not require an additional TLB shootdown. Rather, the TLB shootdown process takes place between the victim and dirty lists where large groups of page entries can be processed during a single shootdown.

The reclaim bit feature, as discussed above, allows discarding victim and dirty list page entries that have that bit set. The copy process block (block 1006 and item D in FIG. 11) does not copy reclaimed pages. In some embodiments, the MPT engine discards pages that are reclaimed at the copy process block. In other embodiments, the reclaimed pages are removed from the victim and dirty lists after the reclaiming takes place.

Although the PMH-TT is a global structure, generally the other structures shown in FIG. 9 and FIG. 11 are localized per socket. Therefore, generally, main memory is allocated per socket and the hidden area of memory (138 in FIG. 1) would include the global PMH-TT and the local additional structures (e.g., LDT, victim list, hot free list, etc.). In some embodiments, the computer system stores a single global PMH-TT in a certain location in one of the memory storage areas for one of the CPUs in the system. In other embodiments, a local copy of the global PMH-TT is stored in each hidden memory area per CPU and broadcast update messages area sent between the CPUs to update their local copies of the PMH-TT so all copies remain identical throughout system operation, though this may be uncommon. Generally, the PMH-TT is divided among the cores/sockets in a system such that a PMH-TT access has an equal probability of hitting memory local to the socket versus memory on another socket.

The time at which to move entries in one list to another list may be dictated by one or more threshold values. FIG. 12A-12D illustrate several embodiments of flow diagrams that processing logic may utilize to determine when to recover memory pages for use (i.e., memory page housekeeping). Each process may be performed by processing logic which may be hardware, software, firmware, or a combination of any of those three forms of logic. In each of these diagrams the referred "threshold" is a value that may be determined at any given time whether prior to boot utilizing testing procedures to determine the optimal threshold to use to maintain peak performance or dynamically at runtime using algorithmic analysis to determine whether the threshold may need to increase or decrease based on current workloads. In some embodiments, not all threshold tests are utilized, rather a subset of the threshold tests are utilized (e.g., 1 or more).

Each "threshold" in question between FIGS. 12A, 12B, 12C, and 12D, as well as any other non-pictured threshold possibilities may be of a similar or different value from each other. Many different threshold values for housekeeping portion of the MPT engine-maintained list data structures may be utilized and each threshold is implementation specific. FIG. 12A-12D simply provide certain examples of how threshold values may be utilized in regard to the MPT engine. In many embodiments discussed, "one or more" entries are copied/ moved. In practice, many times the number of list entries that are copied/moved is the total number of entries in the list (i.e., the list is entirely flushed). In other embodiments, there is a set maximum number of list entries that are copied/moved in a block and if the total number of entries exceeds the maximum, then for any single process the maximum number allowed to be copied/moved at once is utilized and one or more follow up processes may be used to take care of any remaining list entries.

Figure 12A:
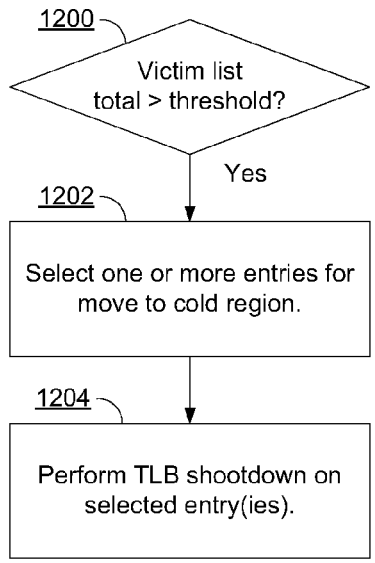
FIG. 12A-12D illustrate several embodiments of flow diagrams that the micro page table engine processing logic may utilize to determine when to recover memory pages for use.

FIG. 12A illustrates an embodiment of a process to determine when the victim list has reached a threshold value to begin housekeeping. In many embodiments, MPT engine processing logic determines if the total number of entries in the victim list has reached a high threshold value (processing block 1200). If it is determined that this is the case, then processing logic selects one or more entries in the victim list for a move into the cold region of memory (processing block 1202). Then processing logic performs a TLB shootdown on the entries that were selected (processing block 1204) and this housekeeping process is complete.

Figure 12B:
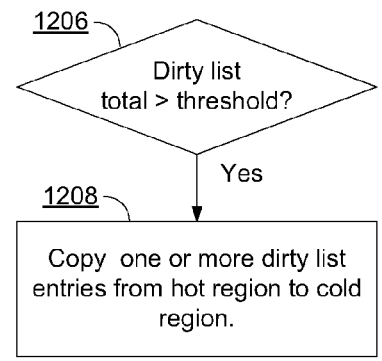

FIG. 12B illustrates an embodiment of a process to determine when the dirty list has reached a high threshold value to begin housekeeping. In many embodiments, MPT engine processing logic determines if the total number of entries in the dirty list has reached a high threshold value (processing block 1206). If it is determined that this is the case, then processing logic copies one or more dirty list entries from the hot region of memory to the cold region of memory (processing block 1208) and the process is complete.

Figure 12C:
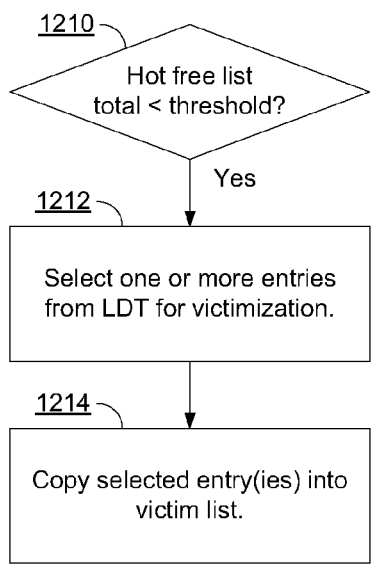

FIG. 12C illustrates an embodiment of a process to determine when the hot free list has reached a low threshold value to begin housekeeping. In many embodiments, MPT engine processing logic determines if the total number of entries in the hot free list has dwindled down to a number that falls below a minimum threshold required value (processing block 1210). If it is determined that this is the case, then processing logic selects one or more entries from the LDT for victimization (processing block 1212). Victimization selection begins a process that is described in detail above in regard to FIG. 10. Returning to FIG. 12C, once the one or more entries have been selected, then processing logic copies the selected entries into the victim list (processing block 1214).

In many embodiments, if the hot free list does not have enough entries in it, victims are first gathered from the FIG. 12C process, then once they are gathered, processing logic performs the process in FIG. 12A on the victims to move the victims into the hot free list.

Figure 12D:
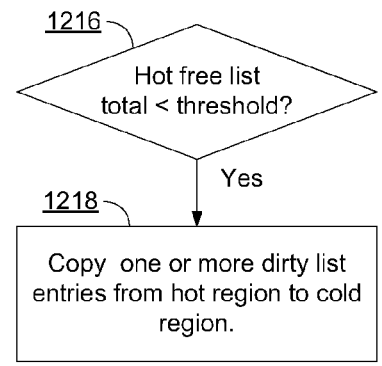

Finally, FIG. 12D illustrates another embodiment of a process to determine when the hot free list has reached a low threshold value to begin housekeeping. As in FIG. 12C, MPT engine processing logic in FIG. 12D determines if the total number of entries in the hot free list has dwindled down to a number that falls below a minimum threshold required value (processing block 1216). If it is determined that this is the case, then processing logic copies one or more dirty list entries from the hot region of memory to the cold region of memory (processing block 1218) and the process is complete. In any event, a TLB Shootdown is required before these copied entries can be reused in the Hot free list.

Two-Level Memory

Figure 13:
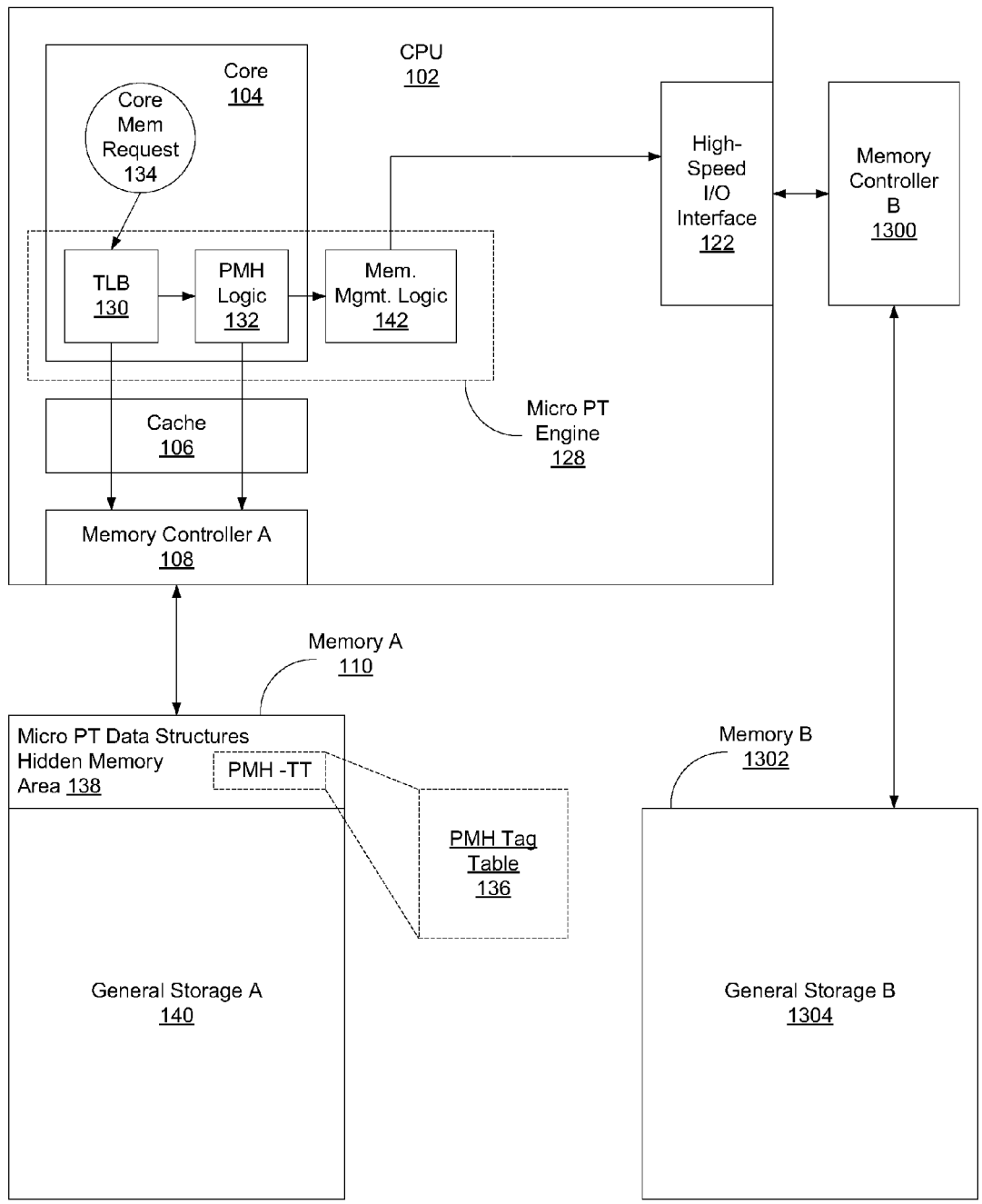
FIG. 13 describes an embodiment of a micro page table managed two-level memory subsystem within a computer system.

A micro-page table engine may also be utilized to implement a two-level memory (2LM) memory subsystem. FIG. 13 describes an embodiment of a micro page table managed two-level memory subsystem within a computer system.

The computer system illustrated in FIG. 13 is similar to the computer system shown in FIG. 1, many components provide similar functionality. Certain elements shown in other versions of this figure, such as the I/O subsystem, are not shown specifically in FIG. 13 for the purpose of clarity. Although not shown, an I/O subsystem similar to one shown in FIG. 1 and FIG. 2 would generally be implemented in the system shown in FIG. 13.

In many embodiments, a discrete memory controller, memory controller B 1300, resides in computer system 100. Memory controller B 1300 is coupled to CPU 102 through a high-speed I/O interface 122 or the memory controller B could be implemented in the CPU die rather than as a discrete chip, though this embodiment is not illustrated. High-speed I/O interface may be one of several types of interconnects, such as PCI-Express, QPI, etc. Memory controller B 1300 in turn, provides control over a second memory, such as memory B 1302. Memory B 1302 may be of a different type of memory than memory A 110. For example, while memory A 110 may comprise a form of DRAM, memory B 1302 may comprise a form of non-volatile memory. In different embodiments, memory B 1302 may be phase change memory (PCM), another form of non-volatile memory, or standard DRAM or low power DRAM, among others.

In many embodiments, memory B 1302, comprising general storage area B 1304, may be considered the main memory within computer system 100 wherein memory A 110, comprising general storage area A 140, may be implemented as a DRAM cache. The cache comprising DRAM and in many embodiments comprising many gigabytes of storage space, may be capable of absorbing most writes during regular operation of the computer system 100. In embodiments where memory B is a non-volatile memory, this absorption effect helps minimize the wear of the non-volatile memory B 1302, which helps minimize the effects of the limited write lifetime of PCM or other forms of NVM as well as hiding the long latency of writes to these types of memory.

An implementation of 2LM using a MPT engine would generally work in a similar fashion to the rank shedding as described in detail above. Essentially, the MPT engine 128 can set up the hot region of memory space to map to general storage A 140 and the cold region of memory space to map to general storage B 1304. Thus, in many embodiments the general storage A is the hot region and the general storage B is the cold region. Data from the memory accesses to the cold region is brought into the hot region with memory page transfer swaps.

Once a memory request is found to not be in the TLB and also found to not be present in the hot region of memory (general storage A 140) after a page-walk lookup process, the MML 142 can then go out to memory controller B 1300 and request access to a page in general storage B 1304.

The standard hot page miss process flow described above in FIG. 8 and FIG. 9 is just reapplied to the FIG. 13 implementation utilizing a second memory controller and a second memory for the cold region of memory. Additionally, the housekeeping of swapping hot and cold pages of memory applies generally as well. In many 2LM embodiments, there are additional processes run by the MML 142. A wear leveling algorithm may be incorporated into the logic within MML 142 when memory B 1302 is non-volatile. During periods of little to no activity, the MML 142 portion of the MPT engine 128 may instruct memory controller B 1300 to redistribute portions of the data stored within memory B 1302 to evenly distribute the wear amongst the PCM devices comprising all of memory B 1302.

Figure 14:
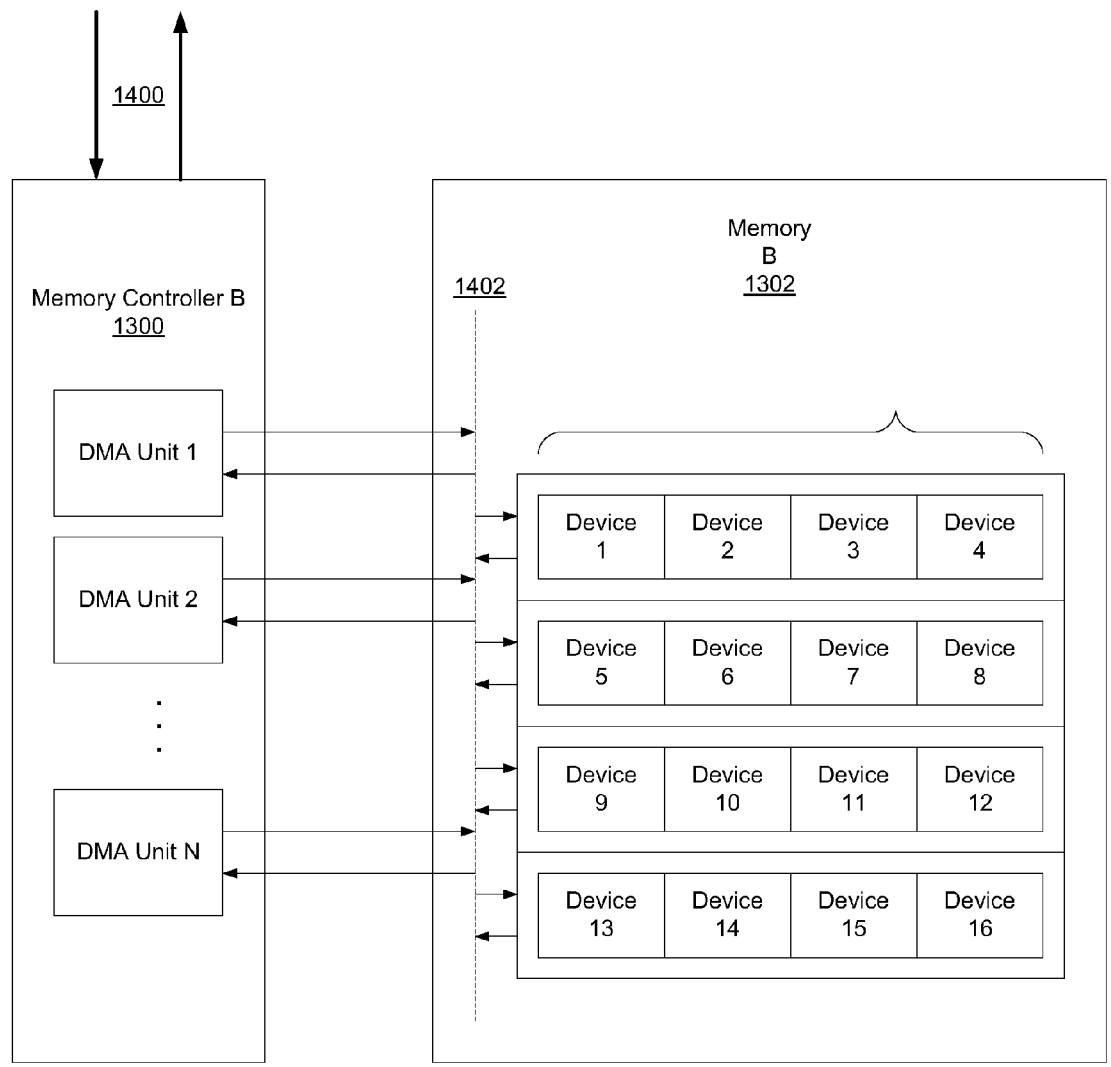
FIG. 14 describes an embodiment of a phase change memory-specific memory subsystem.

FIG. 14 describes an embodiment of a PCM-specific memory subsystem. Memory B 1302 is shown in a x16 PCM device configuration. In many other embodiments that are not shown, the PCM devices may be stacked several devices high to further increase storage with a relatively small increase delay in access times. The memory B controller 1300 is coupled to a CPU by way of link 1400. Requests come into the controller from logic in the CPU. The memory B controller 1300 may comprise several DMA units (units 1-N) that are coupled with an integrated link 1502 (i.e., bus) in memory B 1302. The DMA units may work in tandem sending requests to memory B 1302 and receiving data back. This data is then sent back across link 1400 to the CPU.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

We claim:

1. A micro page table engine apparatus comprising:
   logic to receive a memory page request for a memory page, wherein the memory page request includes a linear address of the memory page;
   a translation lookaside buffer (TLB) to store one or more memory page address translations configured to translate linear addresses to platform physical addresses that map to micro physical addresses of a memory;
   a page miss handler tag table configured to store a plurality of entries configured to index platform physical addresses to micro physical addresses, wherein each entry, in addition to an index indexing a platform physical address to a micro physical address, includes state information of a memory page associated with the micro physical address;
   a page miss handler logic to perform a micro physical address lookup in the page miss handler tag table in response to the TLB not storing the memory page address translation for the memory page referenced by the memory page request; and
   a memory management logic to implement rank shedding of the memory, including updating the state information in the entries of the page miss handler tag table to reflect results of rank shedding related operations performed on the memory.

2. The apparatus of claim 1, wherein the page miss handler tag table is located in a hidden area of a system memory accessible by the micro page table engine.

3. The apparatus of claim 2, wherein the page miss handler tag table is fully associative.

4. The apparatus of claim 1, wherein the memory is divisible into one or more active or inactive regions, and the state information comprises state information indicative of whether a memory page associated with a micro physical address is in an active or inactive region.

5. The apparatus of claim 4, wherein the memory management logic is operable to free a first memory page in an active region by transferring data from the first memory page to a second memory page in an inactive region, and update the page miss handler tag table to reflect the transfer.

6. The apparatus of claim 4, the memory management logic is operable to transfer data from a third memory page in the inactive region to the first memory page in the active region in response to the received memory request targeting the third memory page in the inactive region, and update the page miss handler tag table to reflect the transfer, including locking the page miss handler tag table during the update.

7. The apparatus of claim 4, wherein the memory comprises two portions of physical memory, a physical memory A and a physical memory B, wherein the memory management logic is operable to designate, during operation, the physical memory A as an active region and the physical memory B as an inactive region.

8. The apparatus of claim 1, wherein the micro-physical addresses define a micro physical address space for the memory, including a range of the micro physical address space that is shared among a plurality of processors, and wherein the memory management logic is operable to prioritize a plurality of portions of the micro physical address space per one of the plurality of processors.

9. A method comprising:
   storing one or more memory page address translations between linear addresses and platform physical addresses in a translation lookaside buffer (TLB), wherein the platform physical addresses map to micro physical addresses of a memory;
storing entries in a page miss handler tag table to index platform physical addresses to micro physical addresses, wherein each entry, in addition to an index indexing a platform physical address to a micro physical address, includes state information of a memory page associated with the micro physical address;
implementing rank shedding of the memory, including updating the state information in the page miss handler tag table to reflect results of rank shedding related operations performed on the memory;
receiving a memory page request for a memory page in the memory, the memory page request including a linear address;
in response to the memory page request, searching the TLB to locate the corresponding platform physical address that maps to a micro physical address of the memory; and
in response to the TLB not storing the memory page address translation for the memory page referenced by the memory page request, searching the page miss handler tag table to obtain updates for the TLB.

10. The method of claim 9, wherein the page miss handler tag table is located in a hidden area of a system memory accessible by the micro page table engine.

11. The method of claim 10, wherein the page miss handler tag table is fully associative.

12. The method of claim 9, wherein implementing comprises dividing the memory into one or more active or inactive regions.

13. The method of claim 12, further comprising:
freeing a first memory page in an active region by transferring data from the first memory page to a second memory page in an inactive region, and updating the page miss handler tag table to reflect the transfer.

14. The method of claim 13, further comprising:
transferring data from a third memory page in the inactive region to the first memory page in the active region in response to the received memory request targeting the third memory page in the inactive region, and updating the page miss handler tag table to reflect the transfer, including locking the page miss handler tag table during the update.

15. The method of claim 12, wherein the memory comprises two portions of physical memory, a physical memory A and a physical memory B, of different memory technologies, and wherein the method further comprises designating the physical memory A as an active region and the physical memory B as an inactive region.

16. The method of claim 9, wherein the micro physical addresses define a micro physical address space for the memory including a range of micro physical address space that is shared among a plurality of processors, and wherein the method further comprises prioritizing a plurality of portions of the micro physical address space per one of the plurality of processors.

17. A non-transitory machine-readable medium having stored thereon instructions, which if executed by a machine, cause the machine to:
store one or more memory page address translations between linear addresses and platform physical addresses in a translation lookaside buffer (TLB), wherein the platform physical addresses map to micro physical addresses of a memory;
store entries in a page miss handler tag table to index platform physical addresses to micro physical addresses, wherein each entry, in addition to an index indexing a platform physical address to a micro physical address, includes state information of a memory page associated with the micro physical address;
implement rank shedding of the memory, including updating the state information in the page miss handler tag table to reflect results of rank shedding related operations performed on the memory;
receive a memory page request for a memory page in the memory, the memory page request including a linear address;
in response to the memory page request, search the TLB to locate the corresponding platform physical address that maps to a micro physical address of the memory; and
in response to the TLB not storing the memory page address translation for the memory page referenced by the memory page request, search the page miss handler tag table to obtain updates for the TLB.

18. The non-transitory machine-readable medium of claim 17, wherein the page miss handler tag table is located in a hidden area of a system memory accessible by the micro page table engine.

19. The non-transitory machine-readable medium of claim 18, wherein the page miss handler tag table is fully associative.

20. The non-transitory machine-readable medium of claim 17, wherein implement comprises division of the memory into one or more active or inactive regions.

21. The non-transitory machine-readable medium of claim 20, wherein the machine is further caused to:
free a first memory page in an active region by transferring data from the first memory page to a second memory page in an inactive region, and update the page miss handler tag table to reflect the transfer.

22. The non-transitory machine-readable medium of claim 21, wherein the machine is further caused to:
transfer data from a third memory page in the inactive region to the first memory page in the active region in response to the received memory request targeting the third memory page in the inactive region, and update the page miss handler tag table to reflect the transfer, including locking the page miss handler tag table during the update.

23. The non-transitory machine-readable medium of claim 20, wherein the memory comprises two portions of physical memory, a physical memory A and a physical memory B, of different memory technologies, and wherein the machine is further caused to designate the physical memory A as an active region and the physical memory B as an inactive region.

24. The non-transitory machine-readable medium of claim 17, wherein the micro physical addresses define a micro physical address space for the memory including a range of micro physical address space that is shared among a plurality of processors, and wherein the machine is further caused to prioritize a plurality of portions of the micro physical address space per one of the plurality of processors.

25. A system, comprising:
a memory, wherein the memory includes a hidden portion for storing at least a page miss handler tag table configured to store a plurality of entries configured to index platform physical addresses to micro physical addresses of the memory, wherein each entry, in addition to an index indexing a platform physical address to a micro physical address, includes state information of a memory page associated with the micro physical address; and a processor, the processor including:
- logic to receive a memory page request for a memory page, wherein the memory page request includes a linear address of the memory page;
- a translation lookaside buffer (TLB) to store one or more memory page address translations configured to translate linear addresses to platform physical addresses;
- a page miss handler logic to perform a micro physical address lookup in the page miss handler tag table in response to the TLB not storing the memory page address translation for the memory page referenced by the memory page request; and
- a memory management logic to implement rank shedding of the memory, including updating the state information in the entries of the page miss handler tag table to reflect results of rank shedding related operations performed on the memory.

* * * * *